United States Patent [19]
Bridges et al.

[11] Patent Number: 5,500,305
[45] Date of Patent: * Mar. 19, 1996

[54] VACUUM INSULATED PANEL AND METHOD OF MAKING A VACUUM INSULATED PANEL

[75] Inventors: John A. Bridges, Nashville; Philip H. Neal, Donelson; John E. Besser, Franklin, all of Tenn.

[73] Assignee: Aladdin Industries, Inc., Nashville, Tenn.

[ * ] Notice: The portion of the term of this patent subsequent to Oct. 12, 2010, has been disclaimed.

[21] Appl. No.: 291,021

[22] Filed: Aug. 16, 1994

Related U.S. Application Data

[63] Continuation of Ser. No. 53,438, Apr. 28, 1993, abandoned, which is a continuation-in-part of Ser. No. 587,344, Sep. 24, 1990, Pat. No. 5,525,408.

[51] Int. Cl.$^6$ .............................. B32B 1/06; B32B 15/04; B32B 15/16
[52] U.S. Cl. .......................... 428/621; 428/624; 428/634; 428/69; 428/76; 428/920; 52/788.1; 29/897.32; 29/DIG. 44
[58] Field of Search ................................ 428/69, 76, 920, 428/621, 624, 634, 586; 52/791, 788.1; 220/420, 421; 29/897.32, DIG. 44

[56] References Cited

U.S. PATENT DOCUMENTS

| | | | |
|---|---|---|---|
| 1,071,817 | 9/1913 | Stanley | 220/422 |
| 1,898,172 | 2/1933 | Comstock | 62/333 |
| 1,898,977 | 2/1933 | Comstock | 62/333 |
| 2,742,385 | 5/1956 | Bovenkirk | 154/45 |
| 2,747,269 | 5/1956 | Atchison | 29/455 |
| 2,768,046 | 10/1956 | Evans | 312/214 |
| 2,867,035 | 1/1959 | Patterson, Jr. | 29/455 |
| 3,052,019 | 9/1962 | Strasser | 29/424 |
| 3,147,877 | 9/1964 | Beckman | 220/422 |

(List continued on next page.)

FOREIGN PATENT DOCUMENTS 0434225  6/1991  European Pat. Off. .

OTHER PUBLICATIONS

"Refrigerator Makers Plan For Future Without CFCs", Wall Street Journal, Dec. 15, 1989, one page.
Portions of article from Popular Science "Refrigerators Without CFCs", Jul. 1990, p. 90.
Portions of article from Appliance, Jun. 1990, one page.
An unidentified publication dated Apr. 30, 1990, two pages.
A packet of materials obtained from the CVI Industry Review Panel meeting held at Marriot Denver West in Golden Colorado on Jun. 21, 1990.
International Search Report and Annex.
John E. Besser, Technical Director of Aladdin Industries Inc. "Long Term Reliability of Vacuum Panels" Sep. 29, 1992.

*Primary Examiner*—John Zimmerman
*Attorney, Agent, or Firm*—Sandler, Greenblum & Bernstein

[57] ABSTRACT

A vacuum insulated panel having high thermal insulating value and long vacuum life, and a method of making such a panel are disclosed. The panel is formed of peripherally welded metal wall members which define a cavity within which, in one embodiment, a compressed block of particulate material is disposed. The particulate material, in this embodiment, serves as a barrier to radiant thermal transmission through the panel, acts as a getter to maintain the vacuum in the panel, and supports the walls of the panel against collapse when the cavity is evacuated. The vacuum insulated panel can be covered with a polyurethane foam insulating material. According to a further embodiment of the invention, the filler within the cavity is a sandwich comprising a compressed layer of particulate material suspended between two layers of fiberglass. In such further embodiment, the layer of particulate material, which can be compressed in situ, serves as a getter and a barrier to radiant thermal transmission, while the fiberglass, making up the overall majority of the filler of the cavity, provides support for the panel members defining the cavity upon evacuation.

49 Claims, 8 Drawing Sheets

U.S. PATENT DOCUMENTS

| | | | |
|---|---|---|---|
| 3,151,365 | 10/1964 | Glaser et al. | 428/69 |
| 3,179,549 | 4/1965 | Strong et al. | 220/421 |
| 3,256,000 | 6/1966 | Howlett, Jr. | 259/4 |
| 3,302,358 | 2/1967 | Jackson | 52/573 |
| 3,514,006 | 5/1967 | Molnar | 220/422 |
| 3,724,703 | 4/1973 | Yamamoto | 220/9 |
| 3,828,960 | 8/1974 | Walles | 428/35.9 |
| 3,921,844 | 11/1975 | Walles | 428/35.9 |
| 3,993,811 | 11/1976 | Walles | 428/35.9 |
| 4,154,364 | 5/1979 | Hagiwara et al. | 220/427 |
| 4,229,945 | 10/1980 | Griffin et al. | 62/229 |
| 4,251,252 | 2/1981 | Frazier | 65/34 |
| 4,296,611 | 10/1981 | Griffin et al. | 62/89 |
| 4,333,588 | 6/1982 | Schreck et al. | 222/164 |
| 4,444,821 | 4/1984 | Young et al. | 428/69 |
| 4,468,423 | 8/1984 | Hall | 428/72 |
| 4,486,482 | 12/1984 | Kobayashi et al. | 428/69 |
| 4,529,638 | 7/1985 | Yamamoto et al. | 428/69 |
| 4,565,723 | 1/1986 | Hirsch | 428/71 |
| 4,594,279 | 6/1986 | Yoneno et al. | 428/69 |
| 4,636,415 | 1/1987 | Barito et al. | 428/68 |
| 4,646,934 | 3/1987 | McAllister | 220/420 |
| 4,664,632 | 6/1987 | Kawasaki et al. | 428/69 |
| 4,668,551 | 5/1987 | Kawasaki et al. | 428/69 |
| 4,681,788 | 7/1987 | Barito et al. | 428/69 |
| 4,704,068 | 11/1987 | Theiben et al. | 220/420 |
| 4,726,974 | 2/1988 | Nowobilski et al. | 428/69 |
| 4,745,015 | 5/1988 | Cheng et al. | 428/35 |
| 4,794,748 | 1/1989 | Schilf | 428/69 |
| 4,798,753 | 1/1989 | Abuaf et al. | 52/393 |
| 4,808,457 | 2/1989 | Kruck et al. | 428/69 |
| 5,018,328 | 5/1991 | Cur et al. | 50/406 |
| 5,033,636 | 7/1991 | Jenkins | 220/430 |
| 5,066,437 | 11/1991 | Barito et al. | 264/46.5 |
| 5,082,335 | 1/1992 | Cur et al. | 312/401 |
| 5,084,320 | 1/1992 | Barito et al. | 428/69 |
| 5,091,233 | 2/1992 | Kirby et al. | 428/69 |
| 5,094,899 | 3/1992 | Rusek, Jr. | 428/69 |
| 5,100,740 | 3/1992 | Neugebauer et al. | 428/622 |

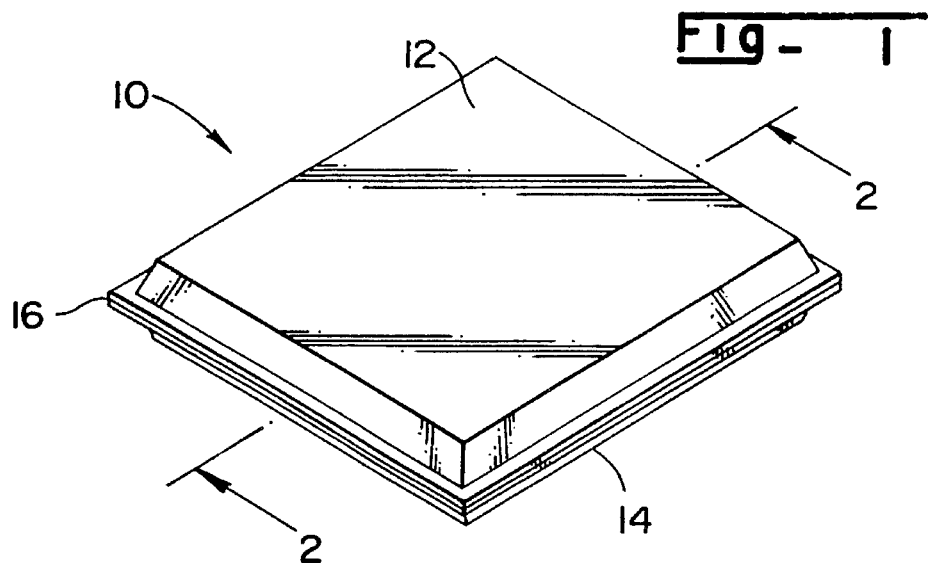
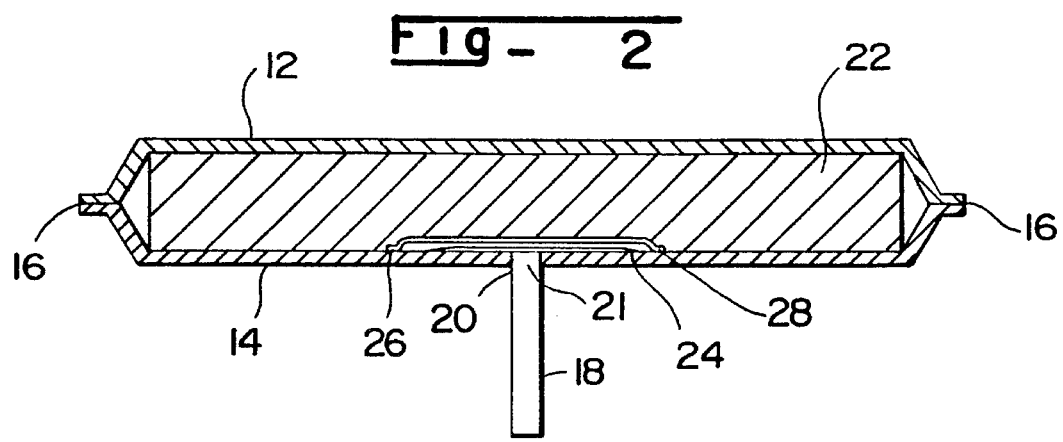
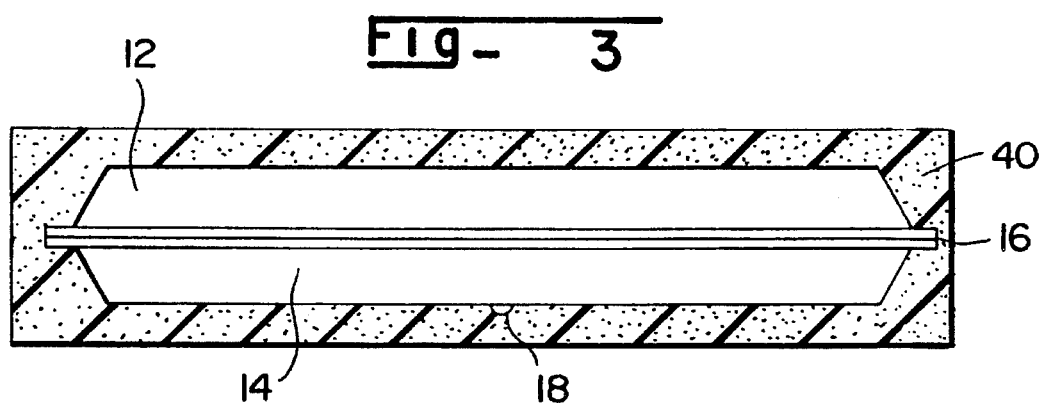

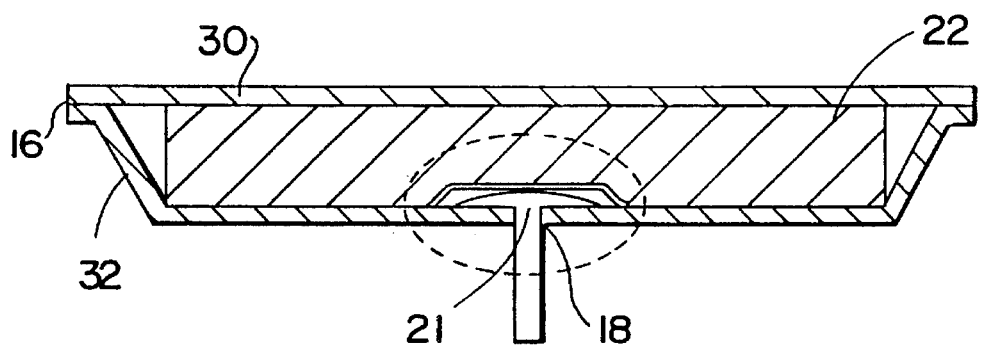
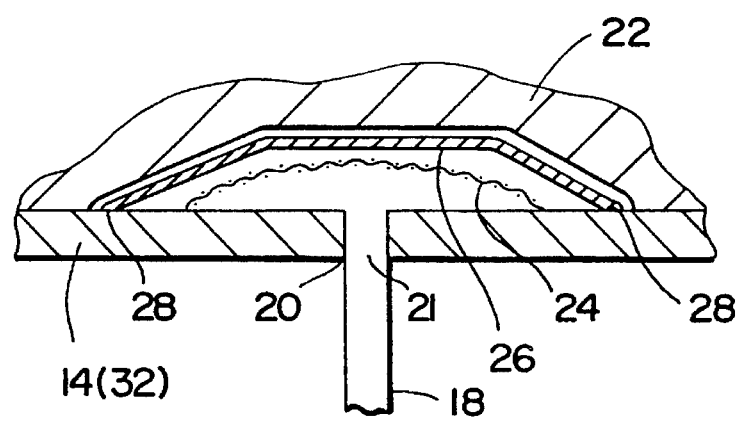
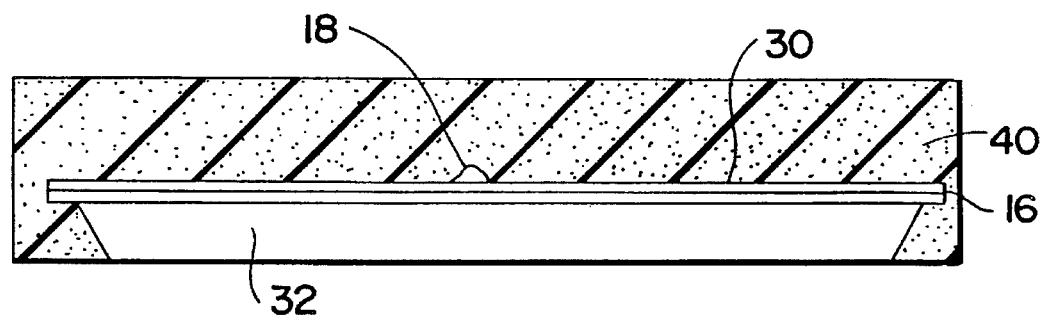

VACUUM INSULATED PANEL AND METHOD OF MAKING A VACUUM INSULATED PANEL

1. RELATED CASES

This application is a continuation of application Ser. No. 08/053,438, filed Apr. 28, 1993, now abandoned, which is a continuation-in-part of application Ser. No. 07/587,344, filed Sep. 24, 1990, which issued as U.S. Pat. No. 5,525,408 on Oct. 12, 1993.

The disclosures of each of the above noted applications are incorporated by reference herein in their entirety.

2. TECHNICAL FIELD OF THE INVENTION

The present invention relates to a vacuum insulated panel and to a method of making such a vacuum insulated panel. More particularly, the present invention is directed to a vacuum insulated panel, and to a method of forming such a panel for use as an insulation barrier to prevent transmission of heat between the sides of the panel. Such panels are particularly well suited for use, e.g., in refrigeration equipment and particularly for use in the door or walls of a refrigerator; however, the scope of potential uses is not limited to the same and a wide variety of applications are presently intended, only some of which are enumerated herein below.

The present invention also relates to a vacuum insulated panel and methods of forming such vacuum insulated panels such that the panels will retain a vacuum for extended periods of time, and particularly for fifteen or more years. Vacuum insulated panels fabricated according to the method of the present invention are extremely efficient at preventing the transmission of heat over extended periods of time, are relatively inexpensive and easy to manufacture, and are thus useable in a wide range of industrial, commercial and residential applications.

3. DISCUSSION OF BACKGROUND AND MATERIAL INFORMATION

Foam plastic panels are currently very widely employed as insulating panels in refrigerators, refrigerated trucks, picnic coolers and freezers. Refrigerator and freezer manufacturers have been constantly striving to increase the efficiency of their products, and in particular, have attempted over the years to produce a reliable, highly efficient and moderate cost product. In the recent past, attempts to increase efficiency in refrigerators and freezers have achieved success by employing more and better foam insulation in the wall panels of the refrigerators and freezers, by increasing the compressor efficiency and by various design changes, including the relocation of the heat generating components of the refrigerator and/or freezer.

Recently, an added emphasis has been provided to motivate manufacturers to strive for increased efficiency in their products. The Department of Energy and the Environmental Protection Agency have both recently promulgated regulations that will have a pronounced effect upon the design, manufacture and sale of refrigerators and freezers in the near future. The Department of Energy has promulgated regulations mandating substantially increased energy efficiency for home appliances, and, since refrigerators in the United States consume an estimated 7% of the electricity generated in the nation, the proposed regulations mandate a substantial improvement in refrigerator efficiency. The Environmental Protection Agency has promulgated regulations to limit the use of fluorocarbons in all applications, since there is increased concern throughout government, industry and society in general that increased use of fluorocarbons might contribute to depletion of the ozone layer and result in an increase in exposure to ultraviolet rays, which is a significant cause of skin cancer. It is conceivable that, in the not too distant future, the use of fluorocarbons will be totally banned.

Fluorocarbons are used in the manufacture of insulating foam materials such as polyurethane, and as a blowing agent that yields a foam having a high resistance to heat transmission. Fluorocarbons are also utilized in refrigerators and freezers as the working fluid (i.e., refrigerant) circulating between the compressor and the evaporator.

As a result of all of the above mentioned factors, the appliance industry is engaged in extensive research directed towards developing various alterative working fluids for compressors. Possible replacements for common Freon 12 in refrigerator and freezer compressors include Freon 122 and Freon 123. Similarly, the urethane industry is exploring a wide range of alternatives to the use of fluorocarbons for use as blowing agents in foams. However, many of the proposed alternatives to fluorocarbons result in less heat resistance, which leads to poorer insulating properties for the resulting foam. Further, some of the proposed substitute refrigerants have flammability problems. As a result of these factors, the appliance industry is highly desirous of finding solutions to the aforementioned problems that will result in increased appliance efficiency and increased appliance reliability, at moderate to low costs, and without the use of fluorocarbons.

It is well known that excellent thermal insulation capability can be obtained by providing a sealed vacuum between two members. Perhaps the most common device utilizing this principal is the ordinary thermos or vacuum flask. In STANLEY, the assignee's own expired U.S. Pat. No. 1,071,817, patented Sep. 2, 1913, such a vacuum or thermos bottle is disclosed. The STANLEY patent discloses filling of an evacuated space between the inner and outer walls of a bottle or flask with a finely divided material, such as metallic oxides, so as to enable the vacuum to achieve a desired degree of heat insulation at a much reduced gaseous pressure, i.e., with much less exhaustion. While this solution has been quite acceptable for the ordinary thermos bottle, which can be replaced or discarded upon deterioration of the vacuum, in a refrigerator or freezer having an average useful life of twenty or more years, it is essential that, if a vacuum is utilized, the vacuum must be maintained virtually indefinitely without deterioration.

As a result, a great deal of research has been undertaken to attempt to provide a long lasting, highly efficient vacuum insulated panel that could be used in refrigerator and freezer cabinets. These research efforts have led to somewhat diverse solutions to the problems involved in the construction of a long-lasting vacuum insulated panel.

In this regard, various types of vacuums must be defined and distinguished. A "rough" or "soft" vacuum is generally defined as a vacuum having a pressure in the range of 1 to $10^{-3}$ torr (i.e., in the millitorr range). On the other hand, a "high" or "hard" vacuum is generally defined as a vacuum having a pressure in the range of $10^{-3}$ to $10^{-6}$ torr (i.e., in the microtorr range). Thus, a soft vacuum is a vacuum that permits relatively more gases to remain within the evacuated space than in the case of a hard vacuum. Accordingly, while it is substantially easier (i.e., faster and thus less expensive)

to obtain a soft vacuum, the thermal insulation efficiency of a hard vacuum is much higher than a soft vacuum. Accordingly, research efforts are now being directed towards developing long-lasting hard vacuum insulating panels.

The difference in thermal conductivity of air or other gases at various pressures can be quite substantial. It is well known that thermal conductivity of air between atmospheric pressure and approximately 10 torr remains relatively constant. Then, there is a sharp drop in thermal conductivity as the pressure is decreased to about $10^{-3}$ torr. There is then little discernable further decrease in thermal conductivity below pressures of about $10^{-3}$ torr. At this level of vacuum, the heat conductivity through the evacuated volumetric space is substantially zero. However, while a hard vacuum is much more efficient as a thermal insulator, a hard vacuum is much harder and much more expensive to obtain, and to retain over the useful life of a refrigerator insulated with vacuum panels.

In addition to the above noted difficulties in forming a hard vacuum insulating panel, other factors are involved in the manufacture and construction of such a vacuum insulating panel. A significant problem exists in that, when evacuating a space to such a low pressure, the walls defining the evacuated space tend to collapse towards each other. This, of course, is highly undesirable, from both a structural as well as from a heat conductive vantage, since, to have a good insulating member, one should avoid direct metal-to-metal contact, and the resulting heat transfer paths that are formed. The most direct previous solution to the problem of panel collapse upon evacuation, has been to increase the structural rigidity of the wall members making up the panel. This, however, has resulted in greater direct conduction of heat through the metal of the wall members and to a decreased insulative value for the vacuum insulated panel as a whole.

As a result, some efforts towards developing vacuum insulated panels have attempted to utilize plastic members to form and/or to support and/or to line the wall elements, because plastic has a generally lower thermal conductivity than metal. However, this has resulted in substantial problems in maintaining the vacuum at a desired insulative effective level over extended periods of time. These problems are caused by the tendency of the plastic materials to slowly release dissolved gases (i.e., outgassing), and by the general permeability of the plastic polymers to the gases of the atmosphere, such as oxygen, nitrogen, carbon dioxide, argon, etc. In order to eliminate these substantial drawbacks to the use of low conductivity plastic materials as all or part of the wall members in the thermal insulated panels, many proposals have been made to either seal the plastic panel or to metallize the surfaces thereof. These solutions have not been entirely successful, and have substantially increased the complexities of manufacturing the panel, and have led to increased manufacturing costs.

In using metal members for the vacuum panel wall members, attempts have been made to use relatively thin members and to provide spacers, reinforcing elements, or supports within the evacuated chamber. The problem with these approaches has been that the supports generally result in areas of increased thermal conductivity through the vacuum, thus resulting in a substantial deterioration of the insulating capacity of the panel as a whole by providing thermal shorts, (i.e., paths of relatively high conductivity) through the panel. Moreover, in forming these internal reinforcing members, substantial problems in the fabrication and uniform spacing of such members have been encountered. As internal reinforcing members, offset dimples, corrugated support panels and sheets containing glass beads, ribs, and rods have been proposed. Each of these methods, however, has required precise alignment of the internal reinforcing members, and has resulted in substantial additional complexities in the fabrication of the vacuum insulated panels as well as in providing additional paths for the conductance of heat through the panels themselves. These additional conductive paths, which have been referred to as thermal shorts, result in a nonuniform heat distribution and lead to substantial deterioration of the heat insulation capacity of the vacuum insulated panel.

On the other hand, the vacuum insulated panels of the present invention, and the method of forming vacuum insulated panels according to the present invention, overcome all of the above mentioned problems and result in vacuum insulated panels of extremely high efficiency, in terms of their impedance to transfer heat, in terms of the long term viability of the vacuum established, and in terms of their manufacturing simplicity; as a result, panels formed in accordance with the present invention result in moderate manufacturing cost.

According to an embodiment of the invention, the entire cavity defined by the metal wall members is filled with a cake or block of powder or particulate material, such as activated carbon black, silica (silica gel), or a combination thereof. A gas-permeable getter-impermeable material is positioned adjacent to a vacuum aperture of the cavity. A vacuum-insulated panel of good durability and insulating qualities is achieved.

According to a further embodiment to the present invention, the filler material contained within the cavity defined by the vacuum panel of the present invention is in the form of a composite material. The composite material comprises a layer of compressed activated carbon and a fiberglass layer. The fiberglass layer is positioned intermediate the carbon layer and the vacuum aperture of the panel. According to this embodiment, the sweeping action of the fiberglass layer into the cavity provides a cleaning action on the weld region and this enables a higher quality weld to be achieved, which results in a better vacuum within the panel and thus a longer-lasting panel.

In accordance with yet a further embodiment of the present invention, the filler material contained within the vacuum panel of the present invention is in the form of a sandwich comprising upper and lower layers of fiberglass material and an intermediate layer of compressed particulate material. The particulate material, which can be compressed in situ, is maintained out of contact with the metal wall members defining the cavity by the fiberglass material. The fiberglass layers act as an insulator and supports the walls of the vacuum panel while the layer of particulate material acts as a getter and as a radiant heat barrier. This embodiment results in extremely long vacuum life and a high insulating value for the vacuum insulated panel.

SUMMARY OF THE INVENTION

The present invention, therefore, is directed to a vacuum insulated panel and to a method of producing such a vacuum insulated panel for use in various environments, and particularly in the cabinet walls of refrigerators and freezers. In this regard, the present invention is directed to a vacuum insulated panel that does not require internal reinforcing members or spacers, but which provides a getter material within the vacuum insulated panel to absorb any gases that may be produced by outgassing from the material of the wall panels thereof. Further, a substantial additional increase in insulation efficiency may be achieved by surrounding at least one side of the vacuum panel of the present invention within a foamed insulating material.

The present invention relates to a vacuum insulated panel comprising first and second wall members joined together to define a cavity, a compressed cake of particulate getter material positioned within the cavity, a device for assisting in evacuating the cavity to establish a vacuum within the cavity, and a structure positioned intermediate the compressed cake of particulate getter material and one of the first and second wall members for preventing the getter material from being evacuated by the device for assisting in evacuating the cavity, the preventing structure comprising a gas-permeable getter-impermeable material.

A device for sealing the cavity after a vacuum is established in the cavity is also provided and the compressed cake comprises compressed activated carbon. The first and second wall members comprise stainless steel panel members, while the gas-permeable getter-impermeable material comprises fiberglass. The panel further includes a foam insulation material covering an exterior side of at least one of the wall members. The preventing structure comprises a fiberglass layer spacing the compressed cake from one of the wall members. Additionally, a fiberglass layer positioned on opposed sides of the compressed cake can be provided, with each layer being adjacent to one of the wall members, one of the layers comprising the preventing structure.

The present invention also related to a method of making a vacuum insulated panel, comprising the steps of providing a compressed block of particulate getter material in a recess in a first panel member completely sealing a peripheral edge of the first panel member to a peripheral edge of a second panel member to define a cavity evacuating the cavity through an aperture in one of the panel members, and preventing the evacuation of particulate getter material through the aperture while the cavity is being evacuated by providing a gas-permeable getter-impermeable material within the cavity, between the block and the one panel member, adjacent to the aperture.

The method of making a vacuum insulated panel includes the compressing block comprises activated carbon and further includes the step of covering at least one exterior side of the panel with an insulating material.

According to the method of the invention the gas-permeable, getter-impermeable material comprises a layer of fiberglass, and further includes providing a fiberglass layer adjacent each panel member and spacing the compressed block from the panel members, wherein one of the layers comprises the gas-permeable, getter-impermeable material.

The invention also relates to a vacuum insulated panel comprising first and second metal wall members joined together about respective peripheral sections of the wall members to define a cavity, a getter positioned within the cavity, the getter comprising a compressed cake of particulate material for filling a portion of the cavity, a device for assisting in evacuating the cavity to establish a vacuum within the cavity, and structure for preventing the getter from being evacuated by the device for assisting in evacuating the cavity, the preventing structure comprising a layer of fiberglass material positioned adjacent the assisting device, the fiberglass material layer contacting one of the metal wall members and the compressed cake of particulate material.

The vacuum insulated panel in accordance with the invention also includes an additional layer of fiberglass material on an opposite side of the compressed cake from the fiberglass material layer, the fiberglass layers spacing the compressed cake from the first and second metal wall members. The layer of fiberglass material can comprise fiberglass batting and the compressed cake can comprise compressed activated carbon. Further, each of the metal wall members comprise stainless steel sheets, which are welded to each other.

The present invention further relates to a vacuum insulated panel comprising first and second peripherally joined, metal panels defining a cavity, a compressed cake positioned within said cavity, a device for assisting in creating a vacuum within the cavity, and the compressed cake comprises a particulate getter material which fills a portion of the cavity. Structure for preventing the compressed getter material from contacting the first and second metal panels are provided, the preventing structure further acts as the structure for preventing the getter from being evacuated during creation of a vacuum within the cavity. The preventing structure comprises a layer of fiberglass material, the cake and the layer of fiberglass material together preventing the metal panels from contacting each other during creation of the vacuum.

The vacuum insulated panel in accordance with the invention utilizes a layer of fiberglass material which comprises fiberglass batting and the compressed cake comprises compressed activated carbon. Additionally, each of the metal wall members comprise stainless steel sheets, which are welded to each other. The device for assisting in creating a vacuum within the cavity comprise an aperture within one of the metal panels. The contact preventing structure includes layers of fiberglass material surrounding the compressed cake, one of the layers comprising the preventing structure.

Additionally the invention includes a method of making a vacuum insulated panel, comprising the steps of providing a compressed block of particulate getter material within a recess in a first metal member, providing a layer of fiberglass material on at least one side of said compressed block, within the recess containing the block and the fiberglass material by completely sealing a peripheral edge of said first metal member to a peripheral edge of a second metal member to define a cavity, and evacuating the cavity through an aperture in one of the metal members, wherein the evacuation of particulate getter material through the aperture while the cavity is being evacuated is prevented by the fiberglass material.

The method of making a vacuum insulated panel further includes sealing the aperture, and the compressed block includes at least activated carbon. Further, the method involves using the compressed block and the fiberglass material to prevent the metal members from contacting each other during evacuation of the cavity. Additionally, the cavity is evacuated by establishing a hard vacuum within the cavity. Further, the particulate getter material is compressed within the recess in the first metal member.

The present invention also relates to a method of forming a vacuum insulated panel comprising the steps of providing a peripherally sealable cavity, positioning, within the cavity, a compressed cake of particulate material between two layers of fiberglass material, providing an evacuation port for the cavity, peripherally sealing the cavity, and evacuating the cavity, through the evacuation port to a hard vacuum. The method also includes sealing the evacuation port to maintain the hard vacuum within the cavity, the cavity being defined by two panel members, wherein the step of sealing the cavity comprises sealing the cavity by contacting the two cavity defining panel members directly to each other, the fiberglass layers preventing the compressed cake from contacting wall surfaces of the cavity and one of the layers being positioned to prevent evacuation of particulate material during evacuation of the cavity.

According to the method of forming the vacuum insulated panel the particulate material and the fiberglass layers are compressed to form a sandwich prior to positioning within the cavity, the compressed block comprises a block of at least activated carbon, and the layers of fiberglass material comprise layers of fiberglass batt. Additionally, a layer of foam insulating material is provided on an exterior surface of the cavity.

The vacuum insulated panel according to the present invention includes first and second metal wall members joined together about respective peripheral sections of the wall members to define a cavity. First and second fiberglass layers are positioned within the cavity. A getter, positioned within the cavity, comprises a layer of compressed particulate material suspended between the first and second fiberglass layers. A structure is also provided for assisting in evacuating the cavity to establish a vacuum within the cavity. The fiberglass layer that is positioned between the layer of particulate material and the assisting structure prevents the getter from being evacuated during the evacuation of the cavity. The first and second fiberglass layers sandwich the layer of particulate material.

According to further features of the invention, the compressed particulate material can have a thickness within the range of between 1/5 and 1/50 of the total thickness of the sandwich, the wall members are stainless steel and a foam insulating material covers an exterior side of at least one wall member.

According to a method of forming a vacuum insulated panel according to the present invention, a peripherally sealable cavity is provided. Within the cavity, a layer of compressed particulate material, which can be compressed in situ, is suspended between two layers of fiberglass material. An evacuation port is provided for the cavity and the cavity is peripherally sealed. The cavity is evacuated, through the evacuation port, to a hard vacuum and the evacuation port is sealed to maintain the hard vacuum within the cavity. The cavity is defined by two panel members. Sealing the cavity occurs by contacting the two cavity defining members directly to each other, while the fiberglass layers prevent the compressed layer of particulate material from contacting the wall surfaces of the panel members. One of the fiberglass layers is positioned to prevent evacuation of particulate material during evacuation of the cavity.

The method further includes providing the particulate material with a thickness within the range of 2 to 20% of the total thickness of the cavity filler materials.

BRIEF DESCRIPTION OF THE DRAWINGS

The invention is further described in the detailed description which follows, with reference to the drawings, by way of non-limiting examples of the preferred embodiments of the present invention, in which like reference numerals represent similar parts throughout the several views, and wherein:

FIG. 1 is a perspective view of the exterior of a vacuum-insulated panel of a first embodiment of the present invention;

FIG. 2 is a cross-sectional view of the vacuum insulated panel of the embodiment of the present invention shown in FIG. 1, taken along line 2—2 of FIG. 1;

FIG. 3 is a partially cross-sectional view of the thermal insulated panel of another embodiment of the present invention, wherein a vacuum panel is encased within a block of polyurethane type foam insulating material;

FIG. 4 is a cross-sectional view of the vacuum insulated panel according to yet another embodiment of the present invention, showing the panel cavity formed of one flat and one dish-shaped member;

FIG. 5 is a cross-sectional close-up view of a portion of the vacuum insulated panel of the invention showing the area adjacent to the evacuation port in greater detail;

FIG. 6 is a cross-sectional view of the vacuum insulated panel according to yet another embodiment of the present invention, showing the panel cavity formed of one flat and one dish-shaped member, wherein the flat side of the panel is covered by or encased in a layer of insulating foam.

DETAILED DESCRIPTION OF THE INVENTION

Figure 7:
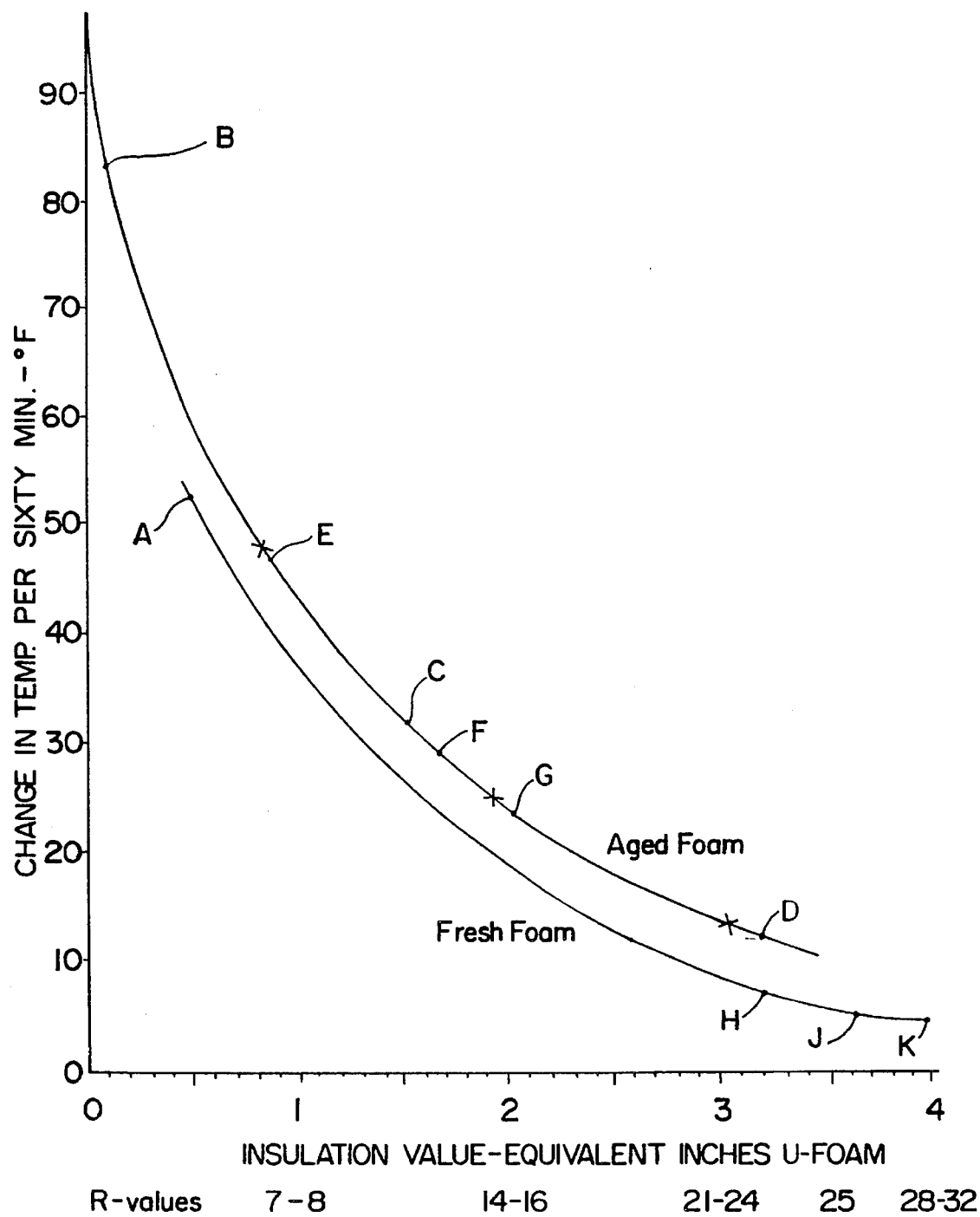
FIG. 7 is a graph showing the insulative effect of various vacuum insulated panels fabricated according to the teachings of one embodiment of the present invention.

In general, the present invention is directed to a vacuum insulated panel and method of making the same. While the vacuum insulated panel of the present invention is particularly directed toward utility in the refrigerator-freezer industry, additional uses therefor are anticipated in ice chests, refrigerated trucks, in roof and building insulation, as well as in any other industrial, commercial or residential environment, wherein highly efficient, long-term thermal insulation is desired. Uses with similar requirements are also clearly within the scope of the present invention.

With particular reference to FIGS. 1 and 2, one embodiment of a vacuum insulated panel according to the present invention is illustrated. The vacuum insulated panel 10 is formed of two wall or panel members 12, 14, comprising relatively thin, metal sheets, such as stainless steel, that are shaped into the illustrated shallow dish-like configuration using a single stage die or any other conventional forming technique. These wall members 12, 14 have a peripherally extending edge 16 at which the two wall members are welded to each to form an air tight cavity. However, prior to the welding of the edges or seams 16, an exhaust or evacuation tube 18 must be attached to the external surface of one of the panels 12, 14, at an aperture 21 provided on one of the panels.

The tube 18, which can be attached at any desired location 20 on either one of the panels, can be attached and secured thereto in any conventional manner. The exhaust tube 18 may be a screw-type nipple such as is used for a Stanley thermos bottle, or a copper tube type that can be welded or brazed, in an air-tight fashion, onto one of the wall members 12, 14 so as to surround an aperture provided in the wall member. Referring to the enlarged view of FIG. 5, directly over the aperture 21, and on the inside of the wall member having the exhaust tube 18 on the outside thereof, a mesh screen 24 is provided, and a thin sheet of fiberglass paper 26 is adhered onto the inner surface of the panel member to surround and completely seal the mesh screen 24 and the area within which it is positioned adjacent to the exhaust port 18. With reference to the illustration of these components in FIG. 5, it is noted that the height dimensions of the screen 24 and paper 26, as well as the spacing therebetween, are grossly exaggerated to facilitate illustration. Moreover, no depression is formed in the block 22 to accommodate these components. Rather, the unexaggerated height of these components is accommodated by the natural resilience of the compressed block 22.

An adhesive 28, for securing the edges of the fiberglass paper 26 onto the inner surface of the panel 14, may comprise a sodium silicate solution because it does not outgas. Outgassing refers to the spontaneous evolution of gas from a material in a vacuum and, as noted above, use of a sodium silicate solution as the adhesive 28 eliminates/minimizes the problem of adhesive outgassing in the vacuum insulated panel. Obviously, outgassing results in deterioration of the vacuum and is to thus be avoided, to as great a degree as possible. Sodium silicate is also selected because it can be baked without deterioration at high temperatures.

The fiberglass paper and wire mesh screen together act as a filter to prevent any of the particulate block 22 (described below) from being evacuated through the exhaust port during the establishment of a hard (or other) vacuum within the cavity defined by the panel members 12, 14, while at the same time permitting the air and any other gases to be exhausted therefrom.

The block 22 illustrated in FIG. 2 represents a compressed block of powder or particulate material which performs a plurality of essential functions in enhancing the heat insulating properties of the vacuum insulated panel of the present invention. According to one preferred embodiment of the present invention, the block can be formed, e.g., of particulate charcoal, activated carbon or carbon black, silica gel (i.e., silica), or an appropriate mixture thereof. As used in the present application, the terms "silica" and "silica gel" are used interchangeably and refer to a material that is generally designated as silica within the industry.

Figure 8:
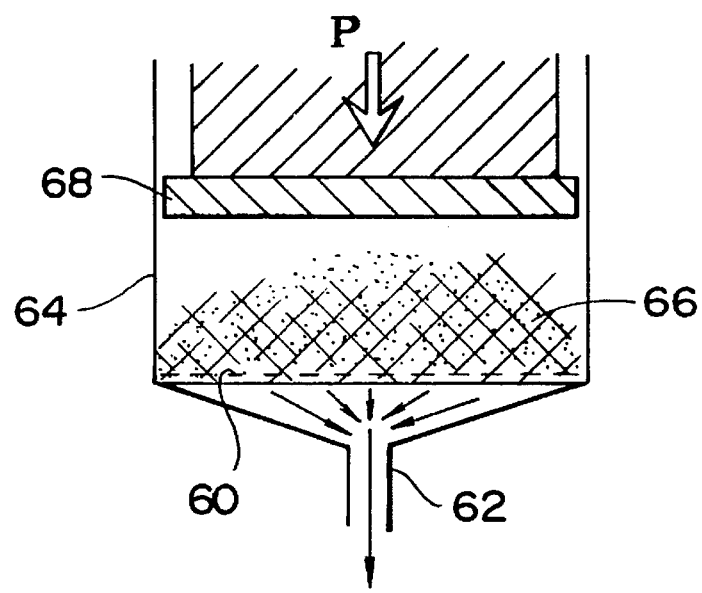
FIG. 8 is a cross-sectional view, in schematic form, of a device that can be used to shape and compress a block of particulate material.

The block is formed, e.g., by compressing the silica gel or carbon to form a solid block or cake of a desired shape and size. The block is manufactured by placing a sheet of fiberglass paper 60 over a vacuum port 62 provided in the bottom of a form 64, as shown in FIG. 8. The form, which is generally rectangular (although any desired shape can be utilized, consistent with the selected panel shape), has dimensions which are very slightly less than the inner dimensions of one of the panel wall members 12, 14. After the proper amount of particulate silica gel, charcoal (or carbon black) 66 is placed within the form over the vacuum, the vacuum is turned on. While the application of a vacuum helps to compress the particulate charcoal or carbon material, a piston type compressor arrangement 68 is provided to apply downward pressure P, on top of the particulate material 66, to tamp it down firmly until it forms a solid cake of the desired density. The packing density utilized according to a preferred feature of the present invention for a charcoal or carbon black particulate material is in the range of 16 to 25 pounds per cubic foot.

Figure 9:
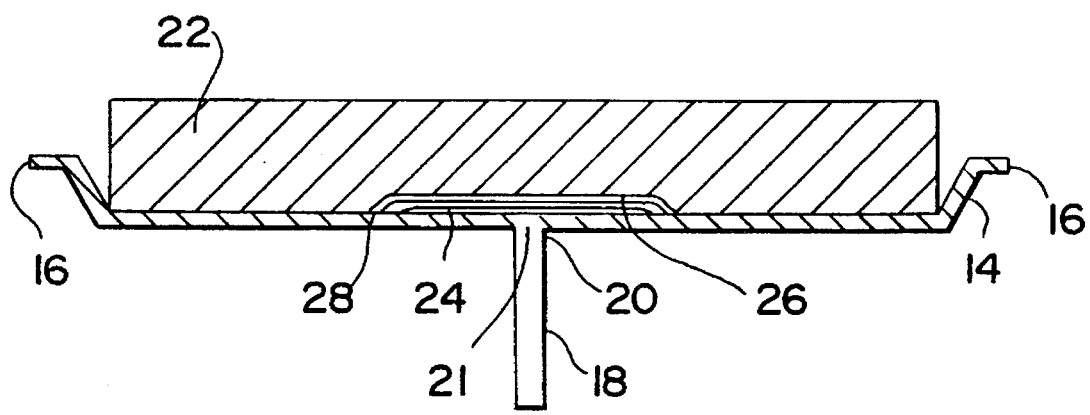
FIG. 9 is a cross-sectional view of the base of the panel of FIG. 1, with a compressed block of particulate material positioned therein in an initial step of forming the FIG. 1 panel.

The charcoal, silica gel, or activated carbon black that is compressed into a cake form and is then inserted into the cavity formed by the panel members 12, 14 performs a plurality of functions in the present vacuum insulated panel. The compressed block of particulate matter, as positioned in the base of the panel, is best illustrated in FIG. 9 before the top panel member is positioned thereover.

The functions performed by the block in the evacuated panel member of the first embodiment of the present invention fall into three broad categories. First, the compressed block of particulate matter acts as a getter. The function of a getter is to absorb any generated gasses outgassing from the walls of the vacuum panel after the panel has been evacuated. A second, and extremely important, function of the compressed block 22 of particulate material positioned within the cavity defined by the panels 12, 14, is to support the panels that form the wall members of the cavity against collapse during the evacuation of the cavity. As mentioned above, a significant shortcoming of known vacuum insulated panels has been the failure to provide satisfactory interior supports to the wall surfaces forming the evacuated cavity in order to prevent the collapse of the cavity upon application of a hard vacuum, which, when used, significantly enhances the energy efficiency of the panel. In the present invention, no such interior support or reinforcing members are necessary because the compressed block of particulate matter is of sufficient density to support the walls in their spaced configuration, as is clearly shown in FIG. 11. In fact, the block of particulate material serves as the only support for spacing the flat main panel portions from each other, during and after application of a desired vacuum. Accordingly, this enables thinner (i.e., more easily deformable) metal sheets to be used for forming the wall panels herein, saving material and thus reducing production costs.

A third significant function of the compressed block of particulate material 22 is to act as a radiant barrier to heat transmission through the cavity, via radiation. While the block of particulate material utilized within the evacuated cavity is compressed, it nevertheless is of a particulate composition, and thus contains a large number of extremely small voids which substantially diminish the amount of heat transmission by radiation occurring within the evacuated cavity. Moreover, the compressed cake enhances uniform heat distribution throughout the panel, and thus minimizes/ eliminates local hot spots that can adversely affect the insulation properties of the panel.

In this regard, charcoal or activated carbon black, according to one preferred embodiment of the present invention, when used as the solid particulate material of the present invention, is utilized in a particle size within a range of 0.4 to 1.0 microns. When silica gel (i.e., silica) is used as the solid particulate material of the present invention, a preferred particle size is in the range of 1.0 through 10.0 microns. In forming a solid block of silica gel, the particles of silica gel, according to one preferred embodiment of the present invention, would be compressed via a mechanism such as is schematically illustrated in FIG. 8, to a density lying within the range of 6 to 12 pounds per cubic foot. This is in contrast to the preferred density range of charcoal or activated carbon black which, as set forth above, lies in a preferred range of 16 to 25 pounds per cubic foot.

As noted above, the compressed block of particulate material has very significant functions in the present invention. Thus, in a first embodiment it acts as a support for the panel walls, it acts as a radiant barrier, and it acts as a getter to keep the vacuum clean over extended periods of time. With regard to these three functions, activated carbon black, or charcoal, is noted to be a substantially better conductor (i.e., worse insulator) than silica gel. On the other hand, silica gel is not as efficient a getter material as the activated carbon black. Accordingly, one desirable composition of a material for forming the particulate cake or block 22 can be obtained by using a combination of silica gel and charcoal to achieve a particulate block having effective getter properties, and yet good insulative properties as well. Obviously, when using a particulate block formed of a mixture of silica gel and activated carbon black, the density to which the block would be compressed would lie somewhere within the ranges set forth above for the carbon black and for the silica gel, depending on the proportions of the various components in the particulate material mixture, and the desired characteristics for the compressed block and complete panel.

Figure 10:
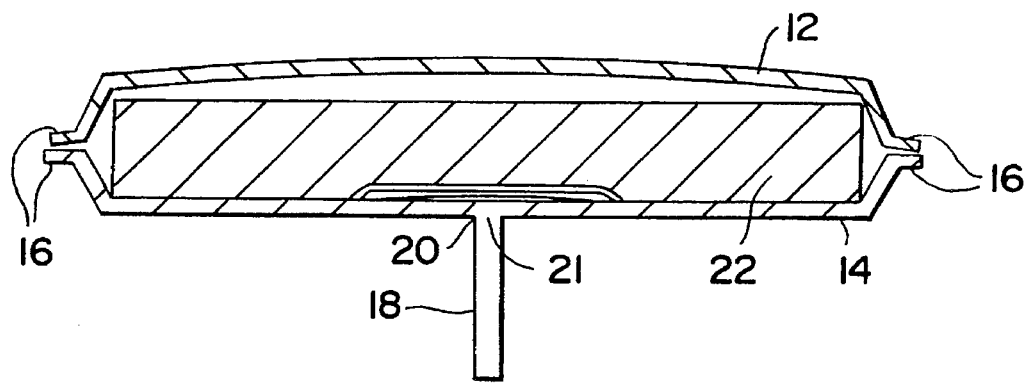
FIG. 10 is a cross-sectional view of the panel of FIG. 1, before a vacuum is created within said panel, but showing the edges of opposed panels positioned prior to being welded to each other, and before a vacuum has been created therein.

In this first embodiment, after the particulate material is compressed into cake form as discussed above, the cake is positioned between the panel members by first placing it into the shallow depression provided in base panel 14, as shown in FIG. 9. As noted above, the dimensions of the block 22 are selected so that it substantially fills the cavity formed within the panels 12, 14. In this regard, the areas shown to exist between the lateral edges of the block 22 and the panel edges (note particularly FIGS. 2 and 4) have been substantially exaggerated in the drawings, but in actuality will be much smaller. In placing the cake 22 within the panels, great care must be taken to ensure that no loose particulate material finds its way onto the overlying peripheral areas (edges or seams) 16 of the panel members 12, 14 where a weld is to be formed. The presence of such particulate charcoal or silica gel material in the area of the weld will prevent the areas from being properly welded and thus will prevent the resulting cavity from being air tight and evacuatable. After the two panel members 12, 14 are oriented with their peripheral portions in contact with each, as shown in FIG. 10, the peripheral portions (edges 16) are clamped and welded. In this regard, any conventional welding techniques suitable for thin sheets, such as resistance welding, electron beam welding, or the like can be employed. The welded seams produced are thereby very durable in the high temperature environment that will be encountered during the subsequent baking process.

Further, in the embodiments illustrated in FIGS. 12–19, the presence of loose particulate material on the overlying peripheral areas 16 has been minimized, as discussed in greater detail hereinafter with respect to the noted FIGS. 12–19. In other words, by forming and positioning the material located between the two metal panels to minimize, if not prevent, particulate material from moving into the edge or flange areas between the panel members, evacuation of the cavity between the two metal panel members, and airtightness of this area will be enhanced. This will result in superior insulative properties for the panels, and increase their life, since there will be less deterioration of the vacuum due to the improved seal between panel members which is created when there is less (if any) particulate material positioned between the two panel members.

Figure 11:
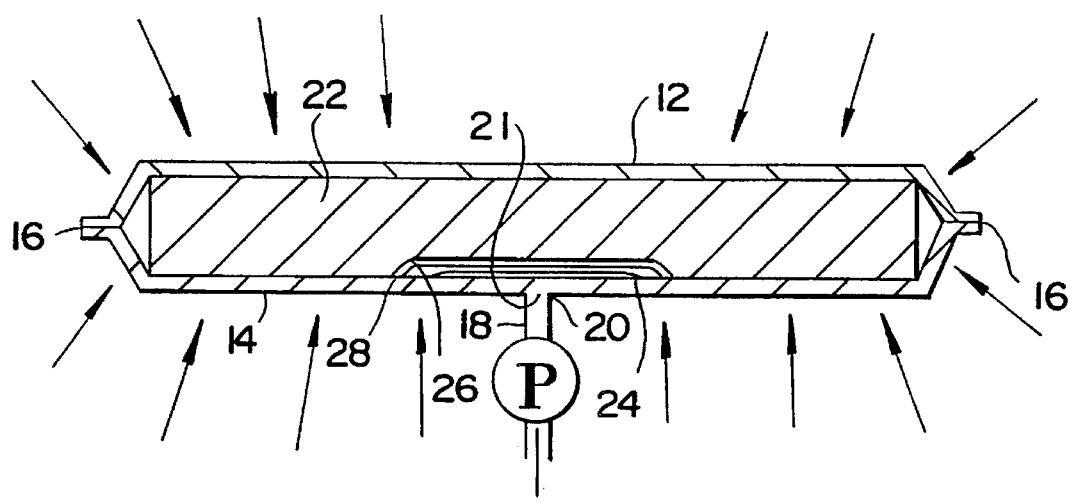
FIG. 11 is a cross-sectional view of the panel of FIG. 10, after a hard vacuum has been created within the panel, with the particulate material block supporting opposite walls of the evacuated panel.

After all four peripheral edges of the panel (which are, e.g., substantially continuous) are welded, an air tight chamber or cavity is formed, the interior of which is to be evacuated. The panel is then baked at about 650° F. to 750° F. for a period in the range of two hours after the peripheral edges of the panel have been welded. While the panel is still hot, and as shown in FIG. 11, the panel, via aperture 21, is immediately placed under a vacuum by means of any conventional vacuum pump connected to the exhaust tube 18, and is evacuated to a hard vacuum (i.e., to at least $10^{-3}$ torr). After evacuation is completed, the exhaust port is sealed by either pinching, plugging, or crimping, as is conventional in forming vacuum chambers. It is critical that during such evacuation, the cake resists the compressive forces on the panels, tending to collapse them towards each other, a function that is performed by compressed block 22. Basically, only the block resists the compressive forces exerted on the main panel walls.

While in the form of the invention illustrated in FIGS. 1 and 2, the wall panel members 12, 14 are illustrated such that each of them is of a substantially identical, shallow dished configuration, this is not an essential feature of the present invention. The present invention can also be embodied in a vacuum insulated panel wherein the wall members defining the cavity to be evacuated are as shown in FIG. 4. As shown therein, the panel members 30 and 32 are of different shapes. In particular, the member 30 is a flat plate while the member 32 is of a dished configuration. While, as illustrated in FIG. 4, the exhaust tube 18 is secured to the dished panel member 32, it is expressly within the scope of the present invention to locate the exhaust tube in the flat member 30, when the panel is formed of one flat and one dished member. If desired, the flat plate 30 can be formed of a mild, cold-rolled (e.g., carbon) steel which is less expensive than the stainless steel that is used for the dish-shaped panel member 32 and for each of the substantially identically dished-shaped wall panel members 12 and 14 as shown in FIGS. 1 and 2 (stainless steel being used in view of the thinness of the panel member walls). Similarly, while in the embodiments of FIGS. 13–19, a flat plate member 30 and a dish-shaped plate 132 are illustrated, the embodiment could equally well involve two substantially identical panel members, each formed of a shallow dish configuration as illustrated in the embodiment of FIGS. 1 and 2, e.g.

Figure 12:
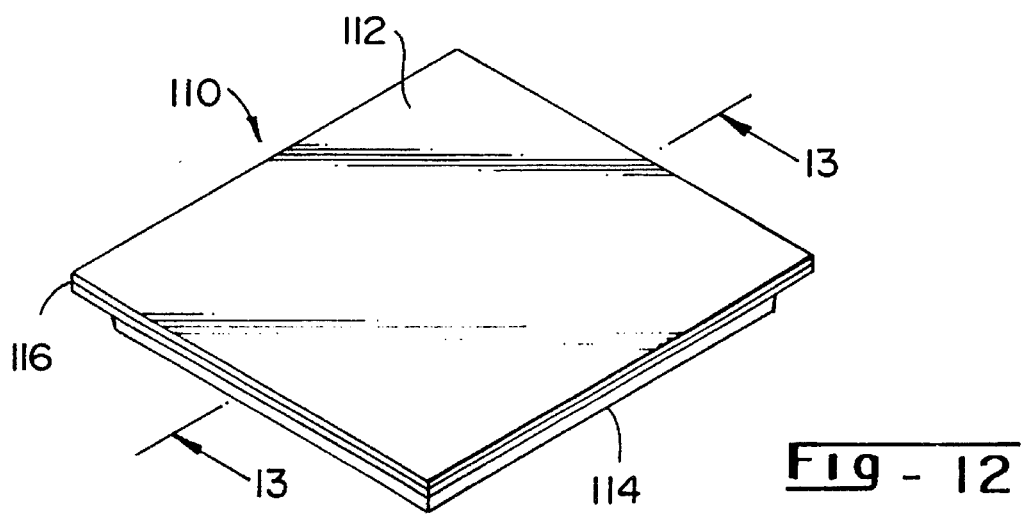
FIG. 12 is perspective view of the exterior of a vacuum insulated panel formed in accordance with yet another embodiment of the present invention.

While two separate outer views of the embodiments of FIGS. 12–19 are not illustrated, because these embodiments generally relate to changes in the construction of the material positioned within the vacuum-insulated panel of the present invention, the exterior views are substantially similar to those shown in FIGS. 1 and 12, depending on whether the panel is formed of two dish-shaped wall members as in FIG. 1, or a single dish-shaped wall member together with a flat wall member as shown in FIG. 12, respectively.

The thickness of the panel members which form the skin of the chamber or cavity which forms a significant feature of the vacuum insulated panel of the present invention, can be, according to a preferred embodiment, selected to be within the range of 0.002–0.013 inch, and preferably 0.004 inch. The use of this preferred thickness range for the panel wall members results in a very light, very thin and thus relatively inexpensive yet highly efficient vacuum insulated panel. The efficiency of the panel as an insulator is enhanced by the use of thinner panel members since such construction minimizes conductive heat transfer through the panel.

Although the vacuum insulated panels as described above are highly suitable for use in refrigerator cabinets and doors and are substantially more efficient from a thermal insulation point of view than an equivalent thickness of blown polyurethane foam, these vacuum insulated panels can nevertheless be made even much more efficient by the addition of a relatively small thickness of the same or a similar foam.

Thus, a further embodiment of the present invention is shown in FIG. 3. The vacuum insulated panel 10, substantially as depicted in and as described with respect to FIGS. 1 and 2, has a compressed block of particulate charcoal, silica gel or activated carbon black (or a combination thereof) disposed therein, and the entire panel has been welded, evacuated and sealed. Thereafter, at least one side of the stainless and/or carbon steel walled vacuum panel is encased within a block 40 of polyurethane or a similar foam. The use of a composite panel consisting of a metal walled vacuum insulated panel 10, wherein at least one side is encased within, or provided with, relatively thin layers of polyurethane foam 40, results in a significantly greater resistance to the transmission of heat than the simple sum of the resistances of such a vacuum insulated panel alone and the equivalent amount of foam alone. The use of such a composite vacuum-panel/polyurethane-foam sandwich results in a synergistic effect with respect to the thermal insulating properties of the composite panel. This synergistic effect is believed to result from the combination of foam and vacuum panel, i.e., the use of two adjacent, yet different insulating materials, and from the absorption and reradiation of the heat within the particulate block contained within the evacuated cavity, which acts to substantially slow the flow of heat through the panel.

In this regard, it is noted that mild cold-rolled steel is substantially less expensive than stainless steel. On the other hand, stainless steel has the substantial advantage of being significantly more resistant to rust than cold-rolled steel. However, it has been discovered that by encasing the evacuated vacuum insulated panel within a block of polyurethane foam, the foam also acts as a rust inhibitor for the panel. The use of a composite or sandwich panel thus enhances the possible use of a less expensive cold-rolled steel instead of the more expensive stainless steel to fabricate at least one of the panel members.

FIG. 6 illustrates a further embodiment of the present invention. Therein, the vacuum insulated panel is constructed of one flat and one dish-shaped member, 30 and 32, respectively. Further, the nipple 18 is positioned on the flat member and the foam 40 is applied about the vacuum insulated panel such that the entire flat member 30 is encased within or covered by the foam. However, a portion of the dish-shaped member is not covered by the foam.

The exemplary embodiment of the invention as disclosed above can be installed within, for example, the door of a refrigerator by securing the flat surface of the dish-shaped member of the panel to the inside of the shell of the door (e.g. by the use of a suitable adhesive) and then applying the foam 40 thereabout to cover the nipple 18 and to fill the remainder of the door shell cavity to achieve a composite structure similar to that shown in FIG. 6.

The above-mentioned synergistic effect of the composite sandwich comprising a vacuum insulated panel encased within dual layers of polyurethane foam was dramatically illustrated during testing which involved placing the composite panel within an, e.g., foam fixture (i.e., which was insulated or isolated from the environment) and placing a container of water at 170° F. to 200° F. in contact with one surface of the foam sandwich. Thermocouples were used to measure the increase in temperature, per unit of time, of the opposite side of various constructions of composite stainless steel vacuum panels and polyurethane foam layers, plain evacuated panels, and ordinary foam slabs. The results of the actual tests, which measure heat flow through the composite panel, are shown in FIG. 7.

With reference to FIG. 7, the ordinate of the graph shows, in degrees Fahrenheit, the change in temperature at the side of the panel opposite from where the hot water was positioned after an interval of sixty minutes. The abscissa of the graph is calibrated in terms of inches of polyurethane foam and represents the equivalent insulating value, in inches of foam, for various constructions of insulating panels. The equivalent R-values are also shown along the abscissa.

As can clearly be seen from the graph, curves A and B were obtained by testing ordinary polyurethane foam panels (aged and fresh, respectively) without any vacuum insulated stainless steel envelope therein, and represent reference lines for the subsequent tests to be performed of the vacuum insulated panels fabricated according to a further feature of the present invention, as well as of composite vacuum insulated panels, fabricated according to a further feature of the invention, wherein one side of the panel is encased in a polyurethane foam sandwich.

Plots A and B are labeled in FIG. 7 to show the insulating value of both fresh foam and aged foam. In this regard, it is noted that fresh foam has a somewhat better insulating value than aged foam. This results from the fact that the freon utilized in the manufacture of the foam is retained in the pores of the fresh foam, and thus lowers the heat conductivity thereof. However, with the passage of time, this retained freon escapes from the pores of the foam and is replaced with other gases having a lower resistance to heat transfer than freon. Accordingly, aged foam has a somewhat lower insulating value than fresh foam. Thus, a one inch aged foam layer will result in a temperature change of 44° (per 60 minutes), while a two inch layer of aged foam will result in a temperature drop of 24° in the same time period. Similarly, a three inch layer of foam will result in a 14° temperature drop over sixty minutes as shown by the X's on curve B in FIG. 7.

Testing a stainless steel vacuum insulated panel, one half inch in thickness and without a foam layer thereabout, as shown in FIG. 2, shows that it has the equivalent insulation value of 1.4 inches of foam (point C). By adding a mere 0.75 inch of foam on one side of this vacuum insulated panel, an insulating value equivalent to about 3.25 inches of foam is obtained (point D). This is substantially higher than the insulation value that one would expect to achieve by adding the insulation values of the stainless steel vacuum insulated panel (1.4 inch equivalent of foam) and the foam itself (0.75 inch). Thus, by combining the vacuum insulated panel with a mere 0.75 inch of foam, an unexpected synergistic effect, equivalent to an extra 1.1 inches of foam, is obtained. This very significant and dramatic increase in insulative value results from the combination of the vacuum insulated panel of the invention with a further feature of the invention, i.e., the encasing of at least one side of the vacuum insulated panel within a layer of polyurethane foam insulating material.

Although the exact mechanical or physical basis for this synergistic effect is not clearly known, it appears that by repeatedly changing the heat transfer mode through the insulative materials making up the composite panel, this effect is enhanced. In other words, when the heat is caused to pass through different types of insulative materials by various heat transmission modes, the composite insulation effect is substantially greater than what one would expect by simply adding together the thermal resistances of each of the individual insulative materials.

With further reference to the graph shown in FIG. 7, reference point E shows the insulative effect of a one-half inch thick panel having a metal skin 0.015 inch in thickness. This has an insulative effects substantially equal to one inch of polyurethane foam. Point F shows the insulative effect of a one inch thick panel having skins (i.e., wall members) formed of 0.015 inch thick steel. Similarly, reference point G shows the insulative effect of a generally similar one inch thick panel having skins formed of steel with a thickness of only 0.012 inch. Thus, by comparing the insulative effect of these two panels designated by reference points F and G, the substantial improvement in insulative effect produced by utilizing panel wall members of thinner materials can be readily visualized. In a similar vein, reference point H shows the insulative effect of a one-half inch thick panel having skins of 0.015 inch and one side of it encased within a one inch polyurethane foam block. Point J shows, as a result of a similar evaluation, the insulative effect of one inch panel having walls of 0.015 inch and one side of it encased within a one-half inch polyurethane foam block. Point K shows a one inch panel having walls of 0.012 inch steel and one side of it encased within a one-half inch polyurethane foam block. As can be seen, these panels exhibit excellent insulating qualities, resulting from the synergistic effect of the vacuum insulated panel according to the present invention and the encasement of one side of the vacuum insulated panel of the present invention within a relatively thin layer of polyurethane foam.

In yet further embodiments of the present invention, in additional to those specifically set forth in parent U.S. Pat. No. 5,252,408, it has been found that a panel with certain desirable properties and greater ease of manufacture, as well as decreased cost and long vacuum life, can be formed by modifying the panel, i.e., by changing the material which is positioned between the two metal layers of the panel.

In this regard, FIGS. 12–16 illustrate a further embodiment of the invention, disclosing an insulating panel 110. Panel 110 has an upper panel wall 112 and a lower panel wall 114 which are formed from relatively thin metal sheets, e.g., of stainless steel which are welded together, e.g., by resistance welding or by any of the other techniques set forth above with respect to the earlier described embodiments of the present invention. As shown in FIG. 12, and as noted above, the upper panel member 112 is substantially flat and the lower panel member 114 is substantially dish-shaped, with the upper wall panel member having a periphery 116 which mates with the out-turned peripheral flange 117 of dish-shaped lower wall panel member 114 and which are welded to each other along the peripheral area 119. Again, as noted above with respect to the embodiments of FIGS. 1 and 4, e.g., although the upper panel 112 is shown as flat, it could instead be provided in the form of a dish-shaped member.

Prior to welding of the edges or seams 116 and 117 to each other, an exhaust or evacuation tube 118 must be attached to the exterior surface of the substantially flat panel 112 (or to either of the dish shaped panels, when such a configuration is used), at an aperture 121 provided in the panel.

Figure 13:
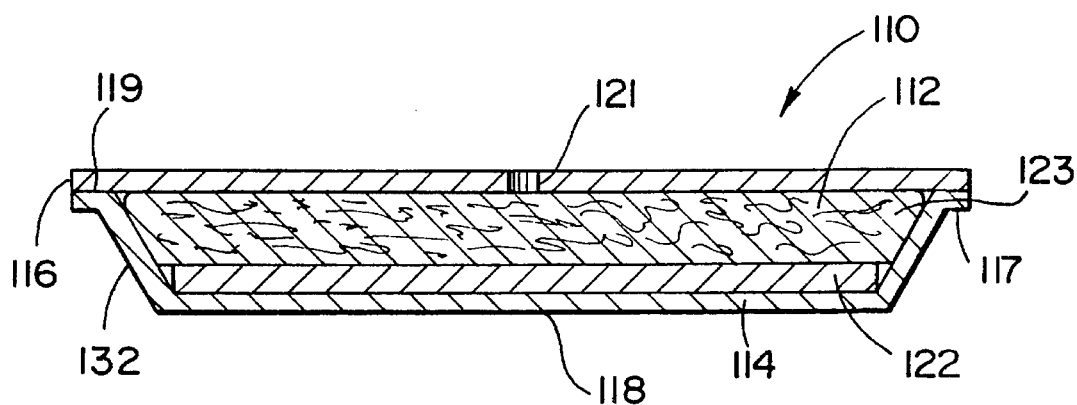
FIG. 13 is a cross-sectional view of the vacuum insulated panel of FIG. 12, taken along line 13—13, illustrating the panel cavity as being formed of one flat and one dish shaped member.

One important feature of the embodiment illustrated in the embodiments of FIGS. 12–16 is clearly shown in FIG. 13, e.g. More particularly, the cake or block of filler material (i.e., the material positioned between the panel members) comprises two distinct materials, namely a compressed block of particulate material 122, and a second adjacent layer of fiberglass batting 123 (or a material with equivalent properties for the present purpose).

The compressed block or cake of particulate material can be any of the materials or combinations of materials discussed above with respect to, e.g., compressed block 22, with one presently contemplated block comprising a compressed block of activated carbon which serves as a radiant barrier for the finished panel.

Directly adjacent to the compressed block of carbon (or other particulate material), which is positioned at the bottom of the dish shaped member 114, is a layer of fiberglass batting 123 which is positioned above the compressed block (as seen in FIG. 13) and directly under the vacuum tube through which the vacuum is drawn between the panel members. In this way, the layer of fiberglass batting can serve as a filter for the carbon material in order to prevent vacuum pump contamination. Using such a filter eliminates the need to use a separate filter, such as fiberglass paper 26, as shown in FIG. 5, or a screen such as screen 24.

In this way, although both of the layers contribute to the insulative properties of the material between the two outer metal layers, the compressed particulate block has, as its primary functions, gettering and providing a radiative barrier whereas the fiberglass layer has as its primary function a filtering of the particulate carbon material to prevent any of the particulate material from entering the vacuum tube.

Thus, while in the first embodiment of the present invention, as discussed with respect to FIGS. 1–11, the particulate material serves as a getter, supports the walls of the panel and acts as a radiant heat barrier, according to the second embodiment of the present invention, the functions of the compressed particulate material are serving as a getter and providing a radiant heat barrier, as set forth in the preceding paragraph.

The relative thicknesses of the carbon and fiberglass layers can be selected in order to balance the desired radiant barrier properties of the compressed particulate block and the filtering properties of the fiberglass batting, based upon known properties of these materials, as discussed above with respect to the embodiment(s) of the invention described in the parent application.

Figure 16:
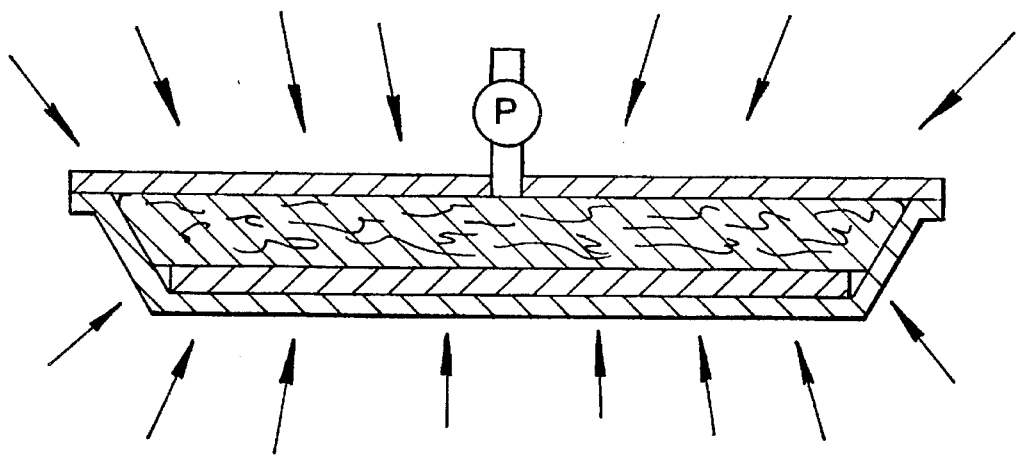
FIG. 16 is a cross-sectional view of the panel of FIG. 12, similar to FIG. 15, after a hard vacuum has been created within the panel, with the particulate material block and the layer of fiberglass material supporting opposite walls of the evacuated panel.

The finished panel in its evacuated state is shown in both FIGS. 13 and 16.

Moreover, the use of the dual material structure between the two metal layers serves to support the two layers when they are evacuated, as did the various inner materials used in the other panels of the present invention, and is also advantageous in eliminating several of the problems which have been found to occur in forming the panels of the various embodiments of FIGS. 1–11.

As was discussed with respect to the previous embodiments, the particulate material must be compressed into a cake form, which can be formed, e.g., in a fashion similar to that illustrated in FIG. 8.

Moreover, according to a yet further preferred feature of the present invention, with respect to the instant embodiment, the particulate material can be compressed in situ. In other words, the particulate material can be compressed within the dish shaped panel 114 by a process similar to that discussed with respect to FIG. 8. This simplifies the process by eliminating handling, transporting and positioning of a preformed compressed block.

Figure 14:
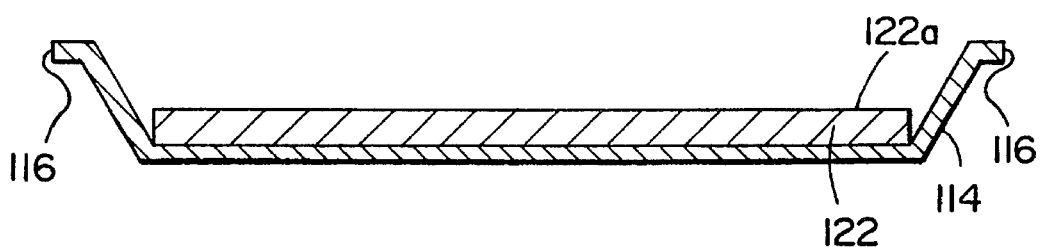
FIG. 14 is a cross-sectional view of the base of the panel of FIG. 12, with a compressed block of particulate material positioned therein in an initial step of forming the panel illustrated in FIG. 12.

Thus, as shown in FIG. 14, the relatively "short" compressed block of material 122 is provided at the bottom of dish 114, preferably with its upper surface 122a positioned below the peripheral flange 116 of dish 114. Thus, rather than completely filling the cavity formed within the panels, it substantially fills only the bottom of the cavity. In this way, there is less danger that the particulate material, which would otherwise be at the same height or at a greater height than the periphery 116 (as shown in the embodiment of FIG. 9, for example) will find its way onto the overlying peripheral edge areas where a weld is to be formed. This results in a better seal when the two metal panels are welded, thereby preserving the integrity of the vacuum formed between the panels, and lengthening the useful life of the insulating panel.

Figure 15:
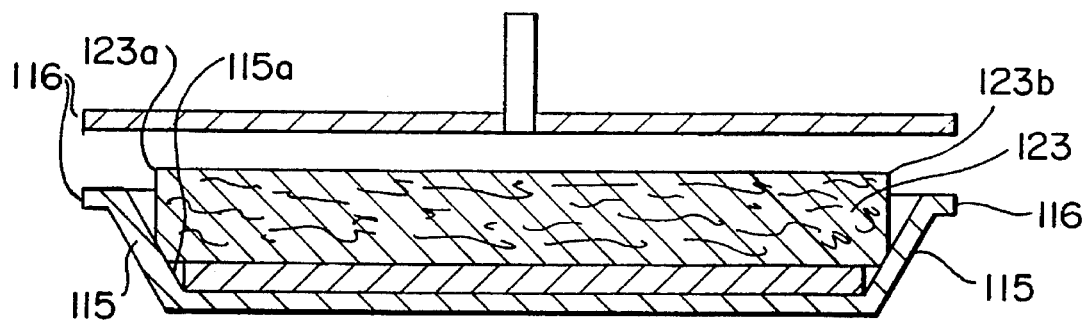
FIG. 15 is a cross-sectional view of the panel of FIG. 12, before a vacuum is created within the panel, but after a layer of fiberglass material has been placed over the compressed block of particulate material, and showing the edges of opposed panels positioned prior to being welded to each other, before a vacuum has been created therein.

Thereafter, as shown in FIG. 15, a layer 123 of fiberglass batting material is positioned on top of the upper surface 122a of the compressed cake of particulate material 122. By positioning the fiberglass batt in this fashion, the fiberglass batt, during formation of the panel, can serve both as a wiper and as a seal to keep carbon or other particulate material forming the cake from undesirably invading the seal formed between the two metal sheets (wall panel members) 112 and 114 forming panel 110. The fiberglass batt serves as a wiper as it is pushed and compressed into the remaining portion of the well formed by dish 114. More particularly, the outer edges of the fiberglass batting 123a and 123b, as illustrated in FIG. 15, push down on the inner surface 115a of inclined wall 115 of the dish shaped panel member 114. As it is compressed, the outer edges of the batt sweep or wipe much of any particulate material which is present on the surface 115 down towards the bottom portion of the panel. Additionally, once it is positioned on top of the compressed cake, the fiberglass batt 123 serves as a seal to keep the particulate material from again moving into the region of the flange or edge area 116. Thus, the fiberglass batt serves to wipe particulate material from the inclined portions of the dish shaped panel member 114, and thereafter it serves as a seal to minimize and/or eliminate particulate material from entering the area 116 between the panels 112 and 114. This again improves the integrity of the seal between the panel members, thereby preserving the vacuum within the panel and lengthening its insulative life.

The use of the fiberglass batt serves several other functions. It provides a larger pumping and filtering area for the vacuum tube, i.e., a larger area through which air can be evacuated from the sandwich formed by the panels without admitting particulate carbon or other material. It thus provides a larger volume filter to keep charcoal from entering the pump during an evacuation procedure, as is illustrated in FIG. 16, and enables faster evacuation of the cavity.

As noted above, the relative thicknesses of the two layers can be varied in order to balance the radiant barrier properties (which is enhanced by having a greater thickness of carbon) and the filtering properties of the fiberglass batt (which is enhanced by having a greater thickness of the fiberglass batt).

Use of a panel formed in accordance with the present embodiment of the invention is thus cheaper and easier to manufacture than the panel of the previous embodiments. No separate screen or fiberglass material is needed, and the fiberglass batting which is used for insulation purposes also serves as a screen.

At present, it is contemplated that the compressed block 112 would be formed from carbon particles within the size range set forth above and compressed to about 16–25 p.s.i., while the fiberglass material could be a fiberglass without binder.

However, any of the materials previously described above could be used to form the compressed cake or block, depending upon the precise characteristics of the panel desired; and, similarly, it is contemplated that different densities and/or materials could be used to form the fiberglass panel 123.

After the fiberglass batt layer is positioned on top of the block of particulate material in the bottom metal panel 114, the panel is completed in a similar fashion to that illustrated in FIGS. 10 and 11 for panel 12, as shown in FIGS. 15 and 16. First, the upper layer 112 is positioned over the panel and the flanges 116 are welded to each other in the same manner as described above with respect to panel members 11, by any appropriate conventional welding method. In this regard, one particular method of welding which is now contemplated for use with the panel with FIGS. 12–16 is resistance welding. Thereafter, a vacuum is applied to the tube 118 via the pump P, and the panel is formed by evacuating the central cavity of the panel. The metal layers are then supported by the combination of batting and the compressed block of particulate material. Tube 118 is then pinched off and sealed in a manner substantially similar to the previous embodiments.

By using two such layers of different insulating material, the panels can be customized for various uses. As noted above, the radiant barrier properties can be changed by changing the relative thicknesses of the compressed carbon block and fiberglass layers, as can the filtering property of the sandwiched material, and the resistance of the material to the pressure exerted by the panel when a vacuum is placed thereon.

As was the case in the embodiments of FIGS. 1–11, after the evacuation is completed, the exhaust port is sealed. It is critical, as was the case with the other embodiment, that during the evacuation, the material between the two metal panels, i.e., the compressed block or cake 122 and the fiberglass batting 123, resist the compressive forces on each other and which tends to collapse the metal panels towards each other. Basically, in this embodiment it is the combination of the compressed particulate block and the fiberglass batting which resist the compressive forces exerted on the two panel walls when a vacuum is placed thereon.

Moreover, it is also contemplated that the panel of the embodiment of FIGS. 12–16 can be used in combination with a foam layer 40 as discussed with respect to the embodiment of FIGS. 3 and 6.

According to a further embodiment of the present invention, a relatively thin layer of compressed particulate material can be utilized and serves as a radiant barrier and as a getter material while the panel walls are supported by the fiberglass layers which make up the majority of the material contained within the panel walls.

Figure 17:
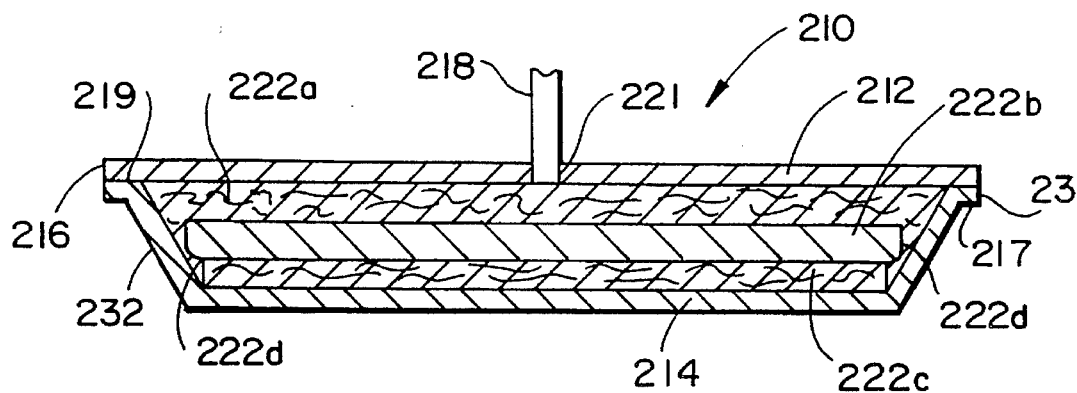
FIG. 17 is a cross-sectional view of a vacuum insulated panel formed in accordance with yet another embodiment of the present invention prior to sealing the evacuation tube located on one panel wall.
Figure 18:
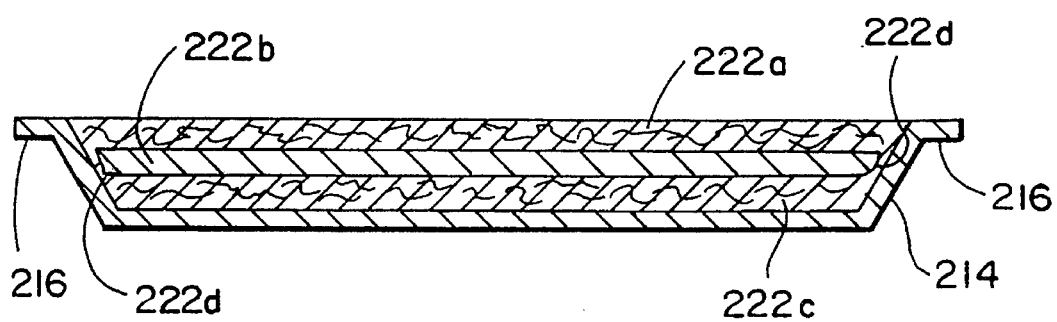
FIG. 18 is a cross-sectional view similar to that of FIG. 13, of the base of the panel of FIG. 17 with a compressed filler block, comprising two layers of compressed fiberglass with a layer of compressed activated carbon therebetween, positioned within the base in an initial step of forming the panel illustrated in FIG. 17.
Figure 19:
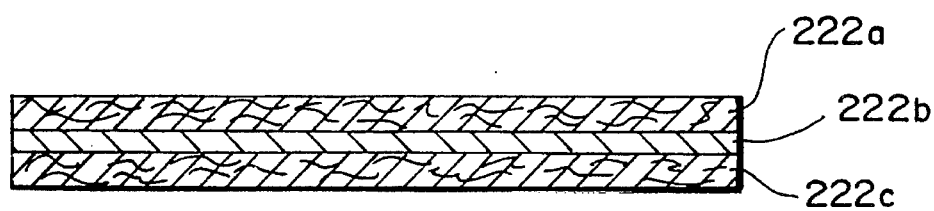
FIG. 19 is a cross-sectional view of the compressed block of the embodiment of FIGS. 17 and 18 before being positioned within the base of a panel.

FIGS. 17–19 illustrate a further embodiment of the present invention with respect to a panel 210. Panel 210 has an upper panel wall 212 and a lower panel wall 214 which are formed from relatively thin metal sheets, e.g., of stainless steel which are welded together, e.g., by resistance welding or any of the other techniques set forth above with respect to the earlier described embodiments of the present invention. As shown in FIG. 17, and as described above, the upper panel member 212 is a substantially flat member while the lower panel member 214 is substantially dish-shaped, with the upper wall panel member having a peripheral edge, seam, or flange 216 which mates with the outer turned peripheral flange seam or edge 217 of the dish-shaped lower wall panel member 214 and which are welded to each other along the peripheral area 219. As noted above, although the upper panel is illustrated in FIG. 17 as a flat panel member, it could equally well, within the teachings of the present invention, be in the form of a dish shaped member similar to the lower panel member.

Prior to welding of the edges or seams 216 and 217 to each other, an exhaust or evacuation tube 218 must be attached to the exterior surface of the substantially flat panel member 212 (or to either of the dish-shaped panels, when such a configuration is used), at an aperture 221 provided in the panel.

Another significant feature of the embodiment illustrated in FIGS. 17–19 is clearly shown in FIG. 19. More particularly, the cake or block of filler material, i.e. the material positioned between the panel members, is formed of two distinct materials in a manner somewhat similar to the embodiment of FIGS. 12–16. However, in the embodiment of FIGS. 17–19, the two distinct materials are arranged in a "sandwich" array. In other words, in the embodiment of FIGS. 17–19 the filler material is formed of upper and lower layers of compressed fiberglass batt 222a and 222c, and a layer of activated compressed carbon 222b is positioned therebetween.

By using such a sandwich type construction for the filler material of the vacuum panel construction according to this embodiment of the invention (utilizing compressed activated carbon between compressed fiberglass batts), a filler member and thus a vacuum panel having significant beneficial features is achieved. In particular, a filler member and vacuum panel having an extremely high R-value and enabling the maintenance of long-term high R-value is achieved, by enabling the vacuum within the panel to be maintained without significant deterioration for extended periods of times.

Within the thickness of the entire filler member or cake positioned within the vacuum panel construction of the present invention, there is a wide range for the relative thicknesses of each of the individual components which are acceptable. Thus, it is within the present contemplation of this preferred embodiment of the invention that the thickness of the intermediate compressed activated carbon layer can be within the range of ⅕ to ¹⁄₅₀ (i.e., 2% to 20%) of the total thickness of the sandwich. While in the drawings, each of the fiberglass layers 222a and 222c are shown to be of generally equal thickness, this is not a limiting feature of the present invention.

An advantage of the sandwich type construction of the filler member is that the activated carbon does not contact either of the metal panel members, but instead is positioned and retained away from the surfaces of the panel members as shown at 222d in FIG. 18. In other words, the particulate material layer is thus suspended between the fiberglass layers. This results in substantially improved insulation values for the composite panel as will be discussed below, while retaining the gettering function of the activated carbon, which in turn results in a vacuum panel of extremely long durability. The entire block of filler material, which in the present embodiment is primarily made up of fiberglass, supports the walls of the panel during and after evacuation, as in the previously described embodiments.

In its compressed form (approximately 14.7 psi, 1.1–1.25 lbs/ft$^3$), the fiberglass batting material is slightly less conductive than the compressed activated carbon (density 2.1 lbs/ft$^3$). Therefore, according to the present embodiment of the instant invention, the layer of compressed activated carbon 222b is suspended or supported between the upper and carbon 222b is suspended or supported between the upper and lower layers 222a and 222c of compressed fiberglass, and is not in direct contact with the surfaces of the panel members. Thus, the compressed activated carbon is kept out of direct contact with the heat source or conduction path of the present panel.

As noted above, the main function of the activated carbon in the present embodiment of the invention is as a radiant barrier and as a getter material, while the wall members are supported by the fiberglass layers. Thus, its location within the panel is of no substantial significance except as to the conduction of heat. Further, and consistent with the above function of the activated carbon as a getter material, since the carbon has a higher conductivity than the fiberglass, a minimum amount of carbon necessary to provide the gettering action can be provided in the present embodiment.

In view of the above, it has also been found advantageous that the fiberglass surround the compressed activated carbon not only on the top and bottom sides, but also about the peripheral sides thereof so that no portion of the carbon is in direct contact with the wall panel members, but that the carbon layer is suspended between the fiberglass layers. This feature is most clearly illustrated in FIGS. 17 and 18 at 222d.

Because in the present embodiment, as in the embodiment of FIGS. 12–15, a fiberglass batt is positioned intermediate the compressed activated carbon and the vacuum tube, the fiberglass acts as a filter for the carbon, thereby preventing contamination of the vacuum pump when a vacuum is placed in the panel. Moreover, by the use of an intermediate layer of compressed activated carbon, a significant defect of previous attempts at manufacturing vacuum panels using fiberglass as the internal filler is overcome. Because the fiberglass contains within it locked-up gasses (which will outgas during the life of the panel), the useful life of a prior vacuum panels including compressed fiberglass as the filler has been rather short (i.e., usually measured in months or a few years). As a result, such prior art panels have been found lacking when considered as insulating panels for refrigerators and other environments where long term viability of the insulation is required. By the use of the sandwich construction of the present embodiment of the invention, the vacuum level can be maintained for virtually unlimited time periods by means of the gettering action of the activated carbon. Thus, using the compressed particulate material as the center of a sandwich, overcomes deficiencies of using fiberglass batt alone.

To compare the insulation values of various filler constructions for use in the vacuum panel of the present invention, comparative tests have been conducted using three types of filler compositions corresponding substantially to the embodiment of FIG. 4 of the present invention, wherein the filler material is a compressed block of activated carbon; the embodiment of FIG. 13 wherein the filler material is a carbon layer positioned remote from the vacuum connection, with a fiberglass batt intermediate the carbon layer and the vacuum connection; and the embodiment of FIG. 17 wherein the filler material is a carbon layer positioned between two fiberglass batts. In each case the envelope (i.e. the upper and lower wall panel members) were substantially the same, i.e., 0.004 inch thick stainless steel members.

The comparative tests were conducted using a vacuum panel member constructed according to each of the above-noted embodiments of the present invention having an approximate overall thickness of ½ inch and being approximately 15×15 inches in size. In each of the embodiments of the present invention involving a filler material comprising activated carbon and fiberglass, approximately 20% to 25% of the filler material was comprised of the compressed carbon, with the remainder being fiberglass.

The test was conducted by mounting a vacuum-insulated panel constructed in accordance with each of the above-described three embodiments, upon a resistance heating pad with a constant temperature control. A thermocouple was positioned on the opposite wall of the panel and the system was positioned within a foam enclosure to isolate the opposed walls of the vacuum panel from each other and from external influences. Thereafter, the resistance heating pad contacting one side of the panel was turned on and the system was allowed to run until a steady-state equilibrium condition was achieved. Thereafter, readings from the thermocouple were used to calculate R-values for the vacuum panel.

As a result of the above-noted tests, the 100% carbon construction of FIG. 4 yielded an R-value of approximately 14, the carbon layer/fiberglass batt construction of FIG. 13 yielded an R-value of approximately 31, while the carbon layer sandwiched between two fiberglass batts of FIG. 19 yielded an R-value of approximately 46. This represents a significant increase in insulating value for the embodiment of FIGS. 17–19, even with respect to the prior embodiments of the present invention.

The sandwich filler construction of this embodiment of the present invention can be fabricated by utilizing in situ compression in an manner similar to that of the embodiment of FIGS. 12–16. However, it is the preferred embodiment of the present invention to pre-compress the entire sandwich prior to positioning the sandwich within the wall panel member of the present invention.

FIG. 18 shows a sandwich according to this embodiment of the invention positioned within the lower wall panel member, in a manner similar to FIG. 14 of the previous embodiment. The compressed filler material fills the entire cavity formed between the panels in the present embodiment. The size of the upper fiberglass layer can be equal to, or larger or smaller than that of the lower fiberglass layer so as to fill the available space within the panel member or members.

Thereafter, in a manner substantially similar to the previous embodiments, after the upper panel member is positioned on the lower panel member containing the filler material therein, and after all four peripheral edges of the panel are welded, an air tight chamber or cavity is formed, the interior of which is to be evacuated. The panel is then baked, and while still hot, as shown in FIG. 11 with respect to the previous embodiment, the panel, via the appropriate aperture, is immediately placed under vacuum by means of any conventional pump connected to the exhaust and then evacuated to a hard vacuum. Of course, after evacuation is completed, the exit port is sealed in a conventional fashion.

Similar to the other described embodiments, the vacuum panel of the embodiment of FIGS. 17–19 can be combined with a polyurethane foamed panel on either or both sides thereof. Such constructions are shown in FIGS. 3 and 6 and can obviously be applied to the panel of the embodiment of FIGS. 17–19 containing the modified filler material therein.

According to the present preferred embodiment of the invention, evacuation of the panel, with the block of filler material contained therein, includes heating the panel for approximately 2 hours at a temperature in the vicinity of 650° F. to achieve a pressure level of between $10^{-3}$–$10^{-4}$ torr. The panel, as described above, being approximately ½ in thick and having an area of 15×15 $in^2$ would contain 600 gm of carbon or approximately 100 g of carbon when combined with one or two fiberglass batt layers. Regardless of the composition of the compressed block of material received within the vacuum panel wall members, the block or cake or filler material will provide support for the panel members to prevent collapse during evacuation of the panel.

While the invention has been described in the preferred embodiments, it is understood that the words which have been used herein are words of description, rather than words of limitation. Changes may be made, within the purview of the appended claims, without departing from the scope and spirit of the invention in its broader aspects. Although the invention has been described herein in reference to particular means, materials and embodiments, it is understood that the invention is not to be limited to the particulars disclosed herein, and that the invention extends to all equivalent structures, methods and uses, e.g., within the scope of the appended claims.

What is claimed:

1. A vacuum insulated panel comprising first and second wall members joined together to define a cavity, a compressed cake of particulate getter material positioned within said cavity, means for assisting in evacuating said cavity to establish a vacuum within said cavity, and means positioned intermediate said compressed cake of particulate getter material and one of said first and second wall members for preventing said getter material from being evacuated by said means for assisting in evacuating said cavity, said preventing means comprising a gas-permeable getter-impermeable material, said first and second wall members comprising stainless steel members.

2. The vacuum insulated panel according to claim 1, further comprising means for sealing said cavity after a vacuum is established in said cavity.

3. The vacuum insulated panel according to claim 1, said compressed cake comprising compressed activated carbon.

4. The vacuum insulated panel according to claim 1, further including a foam insulation material covering an exterior side of at least one of said wall members.

5. The vacuum insulated panel according to claim 1, said preventing means comprising a fiberglass layer, said fiberglass layer spacing said compressed cake from said one of said wall members.

6. The vacuum insulated panel of claim 1, further comprising a fiberglass layer positioned on opposed sides of said compressed cake, each layer being adjacent to one of said wall members, one of said layers comprising said preventing means.

7. A vacuum insulated panel comprising first and second wall members joined together to define a cavity, a compressed cake of particulate getter material positioned within said cavity, means for assisting in evacuating said cavity to establish a vacuum within said cavity, and means positioned intermediate said compressed cake of particulate getter material and one of said first and second wall members for preventing said getter material from being evacuated by said means for assisting in evacuating said cavity, said preventing means comprising a gas-permeable getter-impermeable material, and gas-permeable getter-impermeable material comprising fiberglass.

8. The vacuum insulated panel according to claim 7, said compressed cake comprising compressed activated carbon.

9. A method of making a vacuum insulated panel, said method comprising the steps of:
- providing a compressed block of particulate getter material in a recess in a first panel member;
- completely sealing a peripheral edge of said first panel member to a peripheral edge of a second panel member to define a cavity;
- evacuating the cavity through an aperture in one of the panel members; and
- preventing the evacuation of particulate getter material through the aperture while the cavity is being evacuated by providing a gas-permeable getter-impermeable material within the cavity, between said block and said one panel member, adjacent to the aperture.

10. The method of making a vacuum insulated panel according to claim 9, wherein the compressed block comprises activated carbon.

11. The method of making a vacuum insulated panel according to claim 9, further comprising the step of covering at least one exterior side of the panel with an insulating material.

12. A vacuum insulated panel made according to the method of claim 9.

13. The method of making a vacuum insulated panel according to claim 9, the gas-permeable, getter-impermeable material comprising a layer of fiberglass.

14. The method of making a vacuum insulated panel according to claim 9, further comprising providing a fiberglass layer adjacent each panel member and spacing the compressed block from the panel members, wherein one of the layers comprises said gas-permeable, getter-impermeable material.

15. A vacuum insulated panel comprising:
- first and second metal wall members joined together about respective peripheral sections of said wall members to define a cavity;
- a getter positioned within said cavity, said getter comprising a compressed cake of particulate material for filling a portion of said cavity;
- means for assisting in evacuating said cavity to establish a vacuum within said cavity; and
- means for preventing said getter from being evacuated by said means for assisting in evacuating said cavity, said preventing means comprising a layer of fiberglass material positioned adjacent said means for assisting, said fiberglass material layer contacting one of said metal wall members and said compressed cake of particulate material.

16. The vacuum insulated panel in accordance with claim 15, further comprising an additional layer of fiberglass material on an opposite side of said compressed cake from said fiberglass material layer, said fiberglass layers spacing said compressed cake from said first and second metal wall members.

17. The vacuum insulated panel in accordance with claim 15, wherein said layer of fiberglass material comprises fiberglass batting.

18. The vacuum insulated panel in accordance with claim 15, wherein said compressed cake comprises compressed activated carbon.

19. The vacuum insulated panel in accordance with claim 15, wherein each of said metal wall members comprise stainless steel sheets, wherein said sheets are welded to each other.

20. A vacuum insulated panel comprising:
- first and second peripherally joined, metal panels defining a cavity;
- a compressed cake positioned within said cavity;
- means for assisting in creating a vacuum within said cavity; and
- said compressed cake comprising a particulate getter material which fills a portion of said cavity, means for preventing said compressed getter material from contacting said first and second metal panels, said preventing means further comprising means for preventing said getter from being evacuated during creation of a vacuum within said cavity, said preventing means comprising a layer of fiberglass material, said cake and said layer of fiberglass material together comprising means for preventing said metal panels from contacting each other during creation of said vacuum.

21. The vacuum insulated panel in accordance with claim 20, wherein said layer of fiberglass material comprises fiberglass batting.

22. The vacuum insulated panel in accordance with claim 20, wherein said compressed cake comprises compressed activated carbon.

23. The vacuum insulated panel in accordance with claim 20, wherein each of said metal wall members comprise stainless steel sheets, wherein said sheets are welded to each other.

24. The vacuum insulated panel in accordance with claim 20, wherein said means for assisting in creating a vacuum within said cavity comprise an aperture within one of said metal panels.

25. The vacuum insulated panel in accordance with claim 20, said means for preventing said compressed getter material from contacting said first and second metal panels comprising layers of fiberglass material surrounding said compressed cake, one of said layers comprising said preventing means.

26. A method of making a vacuum insulated panel, said method comprising the steps of:
- providing a compressed block of particulate getter material within a recess in a first metal member;
- providing a layer of fiberglass material on at least one side of said compressed block, within the recess;
- containing said block and said fiberglass material by completely sealing a peripheral edge of said first metal member to a peripheral edge of a second metal member to define a cavity; and
- evacuating the cavity through an aperture in one of said metal members, wherein the evacuation of particulate getter material through said aperture while said cavity is being evacuated is prevented by said fiberglass material.

27. The method of making a vacuum insulated panel according to claim 26, further comprising sealing said aperture.

28. The method of making a vacuum insulated panel according to claim 26, wherein said compressed block includes at least activated carbon.

29. The method of making a vacuum insulated panel according to claim 26, further comprising using said compressed block and said fiberglass material to prevent said metal members from contacting each other during evacuation of said cavity.

30. The method of making a vacuum insulated panel according to claim 26, wherein said cavity is evacuated by establishing a hard vacuum within said cavity.

31. A vacuum insulated panel made in accordance with the method of claim 26.

32. The method of making a vacuum insulated panel according to claim 26, wherein said particulate getter material is compressed within the recess in said first metal member.

33. A method of forming a vacuum insulated panel comprising the steps of:
   providing a peripherally sealable cavity;
   positioning, within the cavity, a compressed cake of particulate material between two layers of fiberglass material;
   providing an evacuation port for the cavity;
   peripherally sealing the cavity;
   evacuating said cavity, through said evacuation port to a hard vacuum; and
   sealing said evacuation port to maintain said hard vacuum within said cavity, said cavity being defined by two panel members, wherein the step of sealing the cavity comprises sealing the cavity by contacting said two cavity defining panel members directly to each other, the fiberglass layers preventing the compressed cake from contacting wall surfaces of the cavity, one of the layers being positioned to prevent evacuation of particulate material during evacuation of the cavity.

34. The method of forming a vacuum insulated panel in accordance with claim 33, wherein the particulate material and the fiberglass layers are compressed to form a sandwich prior to positioning within the cavity.

35. The method in accordance with claim 33, wherein said compressed block comprises a block of at least activated carbon.

36. The method in accordance with claim 33, wherein said layers of fiberglass material comprise layers of fiberglass batt.

37. The method in accord with claim 33, further providing a layer of foam insulating material on an exterior surface of the cavity.

38. A vacuum insulated panel comprising:
   first and second metal wall members joined together about respective peripheral sections of said wall members to define a cavity;
   first and second fiberglass layers positioned within said cavity;
   a getter positioned within said cavity, said getter comprising a compressed layer of particulate material suspended between opposed surfaces of said first and second fiberglass layers and extending over substantially an entire opposed surface of said fiberglass layers;
   a structure for assisting in evacuating said cavity to establish a vacuum within said cavity; and
   one of said of first and second fiberglass layers positioned between said layer of particulate material and said assisting structure, and preventing said getter from being evacuated from said cavity, said first and second fiberglass layers forming a sandwich with said layer of particulate material.

39. The vacuum insulated panel according to claim 38, said particulate layer having a thickness within the range of 2% to 20% of the total thickness of said sandwich.

40. The vacuum insulated panel according to claim 38, said first and second wall members comprising stainless steel panels.

41. The vacuum insulated panel according to claim 38, further including a foam insulating material covering an exterior side of at least one of said wall members.

42. The vacuum insulated panel according to claim 38, said fiberglass layers are arranged to prevent contact between said particulate material and said wall members.

43. The vacuum insulated panel according to claim 38, said particulate material comprising a radiant heat barrier within said cavity.

44. A method of forming a vacuum insulated panel comprising the steps of:
   providing a peripherally sealable cavity;
   positioning, within said cavity, a layer of particulate material suspended between opposed surfaces of two layers of fiberglass material, the layer of particulate material positioned to extend over substantially an entire opposed surface of the layers of fiberglass material;
   providing an evacuation port for the cavity;
   peripherally sealing the cavity;
   compressing said layer of particulate material and evacuating the cavity, through the evacuation port to a hard vacuum; and
   sealing the evacuation port to maintain the hard vacuum within the cavity, the cavity being defined by two panel members, wherein the step of sealing the cavity comprises sealing the cavity by contacting the two cavity defining panel members directly to each other, the fiberglass layers preventing the compressed layer of particulate material from contacting the surfaces of the panel members defining the cavity, one of the fiberglass layers being positioned to prevent evacuation of particulate material during evacuation of the cavity.

45. The method of forming a vacuum insulated panel according to claim 44, wherein the step of positioning a layer of particulate material within the cavity comprises positioning a layer of particulate material having a thickness within the range of 2% to 20% of the total thickness of the layer of particulate material and the two layers of fiberglass material.

46. The method of forming a vacuum insulated panel according to claim 44, further providing a layer of foam insulating material on at least one exterior surface of the cavity.

47. The method of forming a vacuum insulated panel according to claim 44, further providing the fiberglass layers to prevent contact of the layer of particulate material with the panel members defining the cavity.

48. The method of forming a vacuum insulated panel according to claim 44, further comprising using the two layers of fiberglass material to support the cavity defining panel members upon evacuation of the cavity.

49. The method of forming a vacuum panel according to claim 44, further comprising using the layer of particulate material as a getter and as a radiant heat barrier within the cavity.

* * * * *

UNITED STATES PATENT AND TRADEMARK OFFICE
CERTIFICATE OF CORRECTION

PATENT NO. : 5,500,305
DATED : March 19, 1996
INVENTOR(S) : J. BRIDGES et al.

It is certified that error appears in the above-indentified patent and that said Letters Patent is hereby corrected as shown below:

On the title page, item: [63], line 3, change "5,525,408" to ---5,252,408---.

Signed and Sealed this

Twentieth Day of May, 1997

*Attest:*

BRUCE LEHMAN

*Attesting Officer*     *Commissioner of Patents and Trademarks*